US011200037B1

(12) United States Patent
Mann et al.

(10) Patent No.: US 11,200,037 B1
(45) Date of Patent: Dec. 14, 2021

(54) SYSTEMS AND METHODS FOR TRANSLATION BASED COMPUTING (TBC) WITH INCORPORATING ONTOLOGY AND PEARL SCHEMA

(71) Applicant: Pluot Labs, Inc., Dover, DE (US)

(72) Inventors: Wallace Mann, San Anselmo, CA (US); Andy Narayanan, Palo Alto, CA (US)

( * ) Notice: Subject to any disclaimer, the term of this patent is extended or adjusted under 35 U.S.C. 154(b) by 0 days.

(21) Appl. No.: 16/824,418

(22) Filed: Mar. 19, 2020

Related U.S. Application Data

(60) Provisional application No. 62/822,549, filed on Mar. 22, 2019.

(51) Int. Cl.
*G06F 8/41* (2018.01)
*G06F 16/2455* (2019.01)
*G06F 16/2452* (2019.01)

(52) U.S. Cl.
CPC .......... *G06F 8/443* (2013.01); *G06F 16/2455* (2019.01); *G06F 16/24522* (2019.01)

(58) Field of Classification Search
CPC . G06F 8/443; G06F 16/2455; G06F 16/24522
USPC ................................. 717/136–153
See application file for complete search history.

(56) References Cited

U.S. PATENT DOCUMENTS

| | | | | |
|---|---|---|---|---|
| 5,898,874 | A * | 4/1999 | Gelfenbain | G06F 3/023 717/140 |
| 6,785,673 | B1 * | 8/2004 | Fernandez | G06F 40/143 |
| 7,016,910 | B2 * | 3/2006 | Egilsson | G06F 16/30 |
| 7,467,149 | B2 * | 12/2008 | Gaurav | G06F 40/143 |
| 7,827,523 | B2 * | 11/2010 | Ahmed | G06F 16/28 717/106 |
| 7,971,002 | B1 * | 6/2011 | Rozas | G06F 12/0815 711/141 |
| 7,984,043 | B1 * | 7/2011 | Waas | G06F 16/8358 707/718 |
| 8,429,179 | B1 * | 4/2013 | Mirhaji | G06F 16/248 707/756 |
| 8,543,563 | B1 * | 9/2013 | Nikoulina | G06F 40/42 707/706 |
| 9,235,567 | B2 * | 1/2016 | Mylonakis | G06F 40/44 |
| 9,779,117 | B1 * | 10/2017 | Guo | H04L 67/10 |
| 10,311,058 | B1 * | 6/2019 | Kumar | G06N 3/0427 |
| 10,489,358 | B2 * | 11/2019 | Bhatti | G06F 16/212 |

(Continued)

OTHER PUBLICATIONS

Silva et al., "Strong Types for Relational Databases", ACM, pp. 1-12 (Year: 2006).*

(Continued)

*Primary Examiner* — Anil Khatri
(74) *Attorney, Agent, or Firm* — Hickman Becker Bingham Ledesma LLP; Malgorzata A. Kulczycka

(57) ABSTRACT

Systems and methods for improving builds of software applications are described herein. In an embodiment, an ontology comprises one or more translation cells comprising context data and software code and a plurality of pearl schema nodes, each of which defining one or more attributes in the ontology. When input data is received at a translation cell, context data in the translation cell is used to translate the input data into canonical data. Context data is then used to translate the canonical data into output data which can be provided to a client computing device.

16 Claims, 26 Drawing Sheets

Pluot Running - high level view

(56) References Cited

U.S. PATENT DOCUMENTS 10,901,973 B1* 1/2021 Senra .................. G06F 16/23
10,963,497 B1* 3/2021 Tablan ............... G06F 16/3344
11,106,734 B1* 8/2021 Batsakis ............ G06F 3/0653

OTHER PUBLICATIONS

Masuoka et al, "Ontology-Enabled Pervasive Computing Applications", IEEE, pp. 68-72 (Year: 2003).*
Kang et al, "Ontology and Search Engine for Cloud Computing System", IEEE, pp. 276-281 (Year: 2011).*
Rompf et al, "Functional Pearl: A SQL to C Compiler in 500 Lines of Code", ACM, pp. 2-9 (Year: 2015).*
Wei et al, "Demonstrating Robust Voice Querying with MUVE: Optimally Visualizing Results of Phonetically Similar Queries", ACM, pp. 2798-2802 (Year: 2021).*
Trummer etal, "Optimally Summarizing Data by Small Fact Sets for Concise Answers to Voice Queries", IEEE, pp. 1715-1726 (Year: 2021).*
Hu et al, "Web Query Translation via Web Log Mining", ACM, pp. 749-750 (Year: 2008).*
Krishnamurthy et al., "Efficient XML-to-SQL Query Translation: Where to Add the Intelligence?", ACM, pp. 144-155 (Year: 2004).*

* cited by examiner

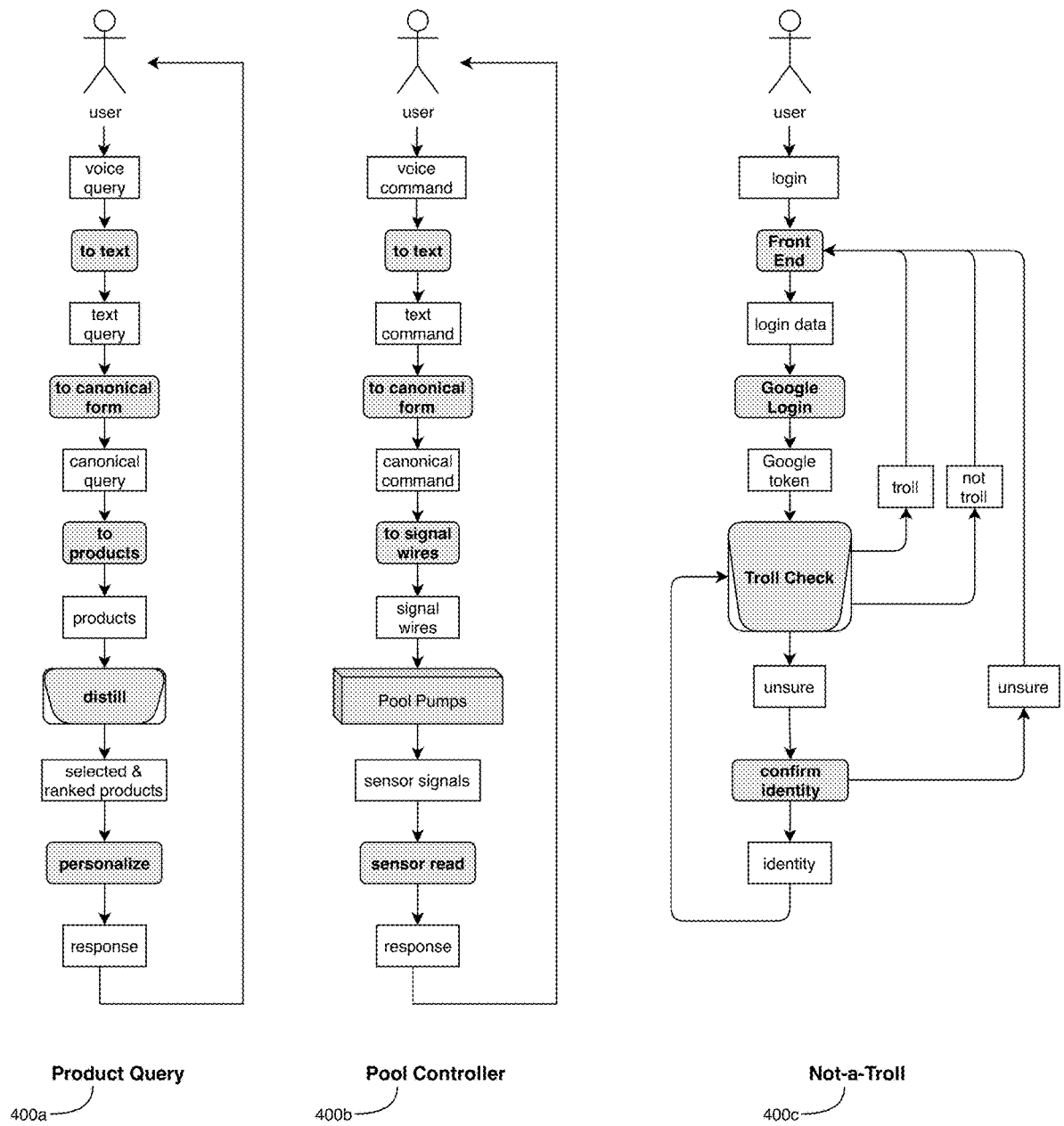
Figure 1: TBC Application Examples

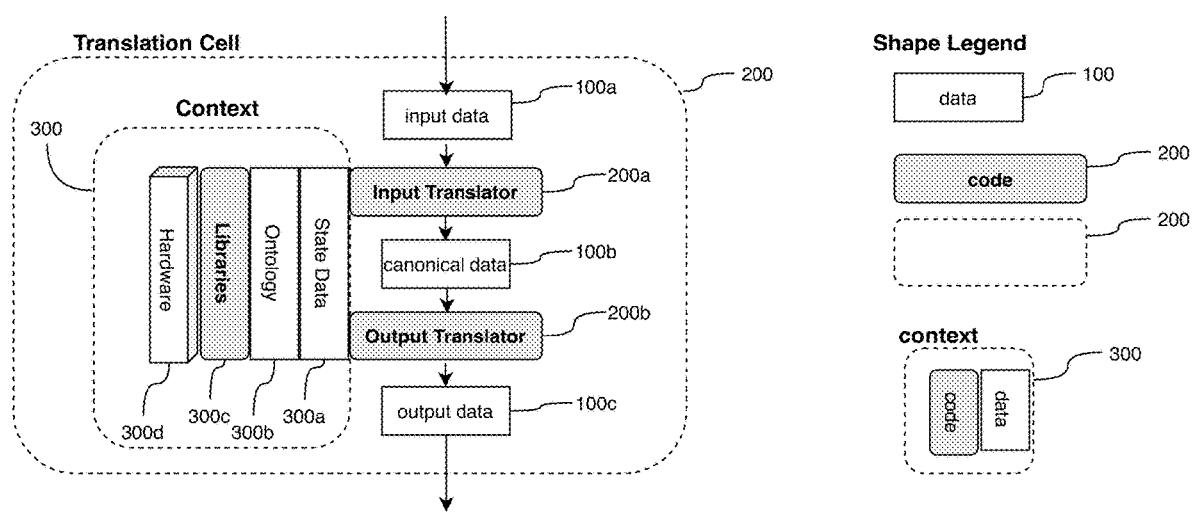
Figure 2: Generic Translation Cell

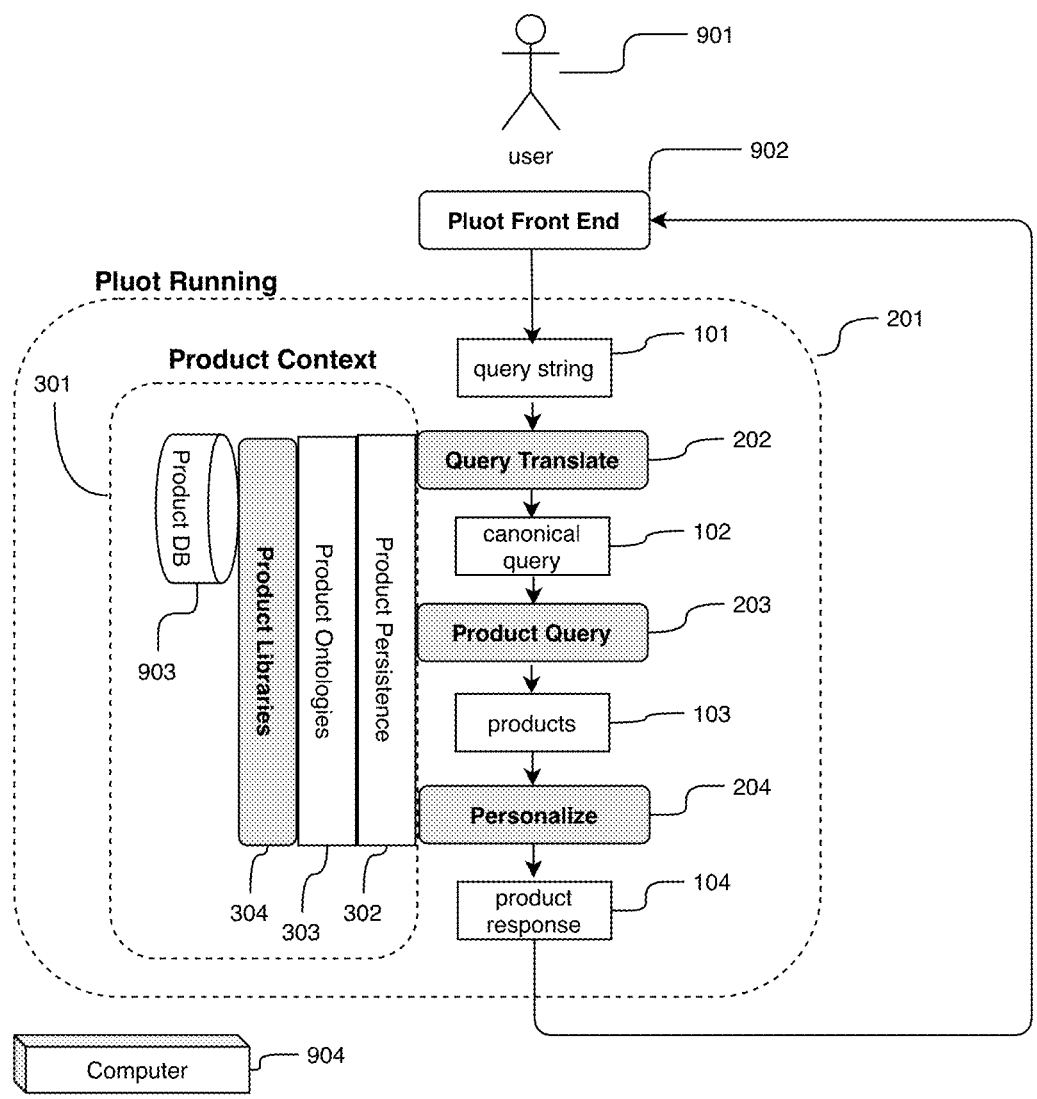
Figure 3: Pluot Running - high level view

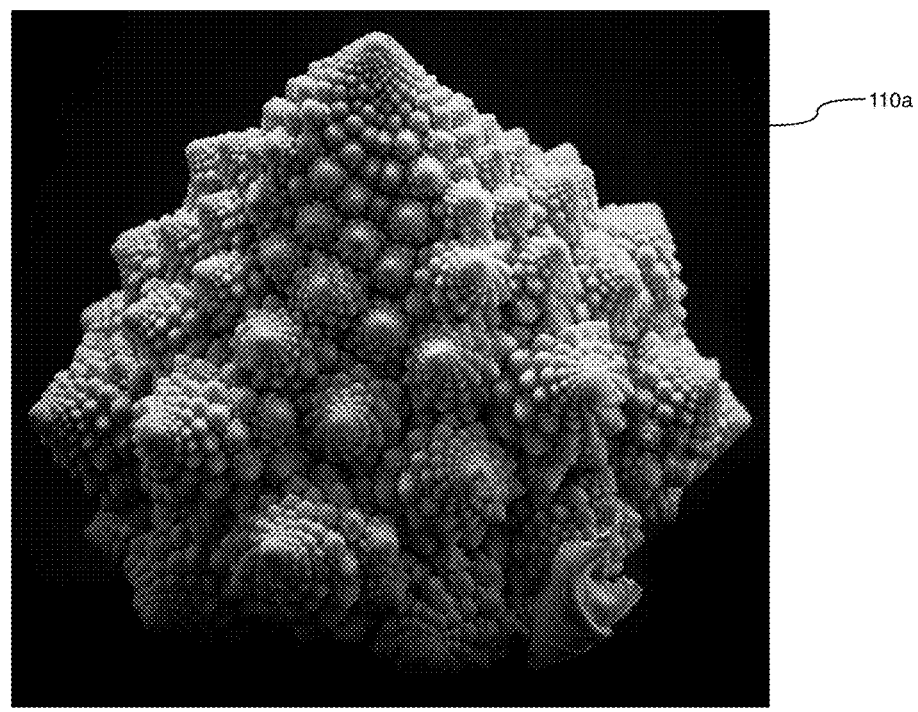
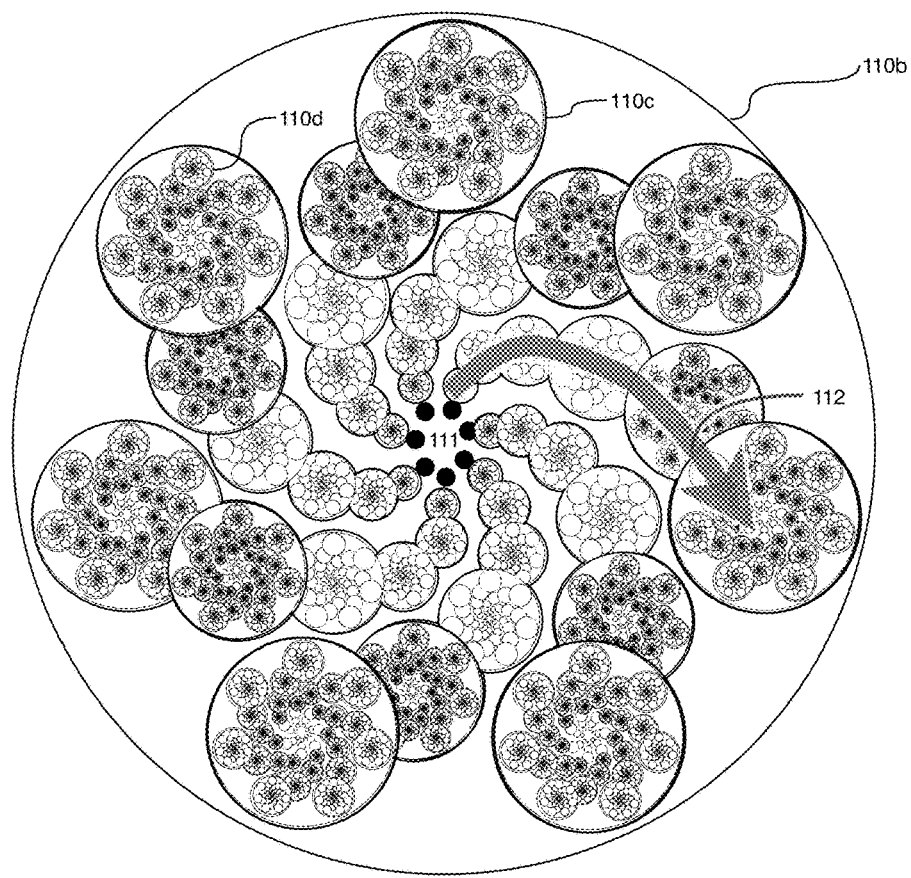
Figure 4: Visualization of Romanesco Pearl

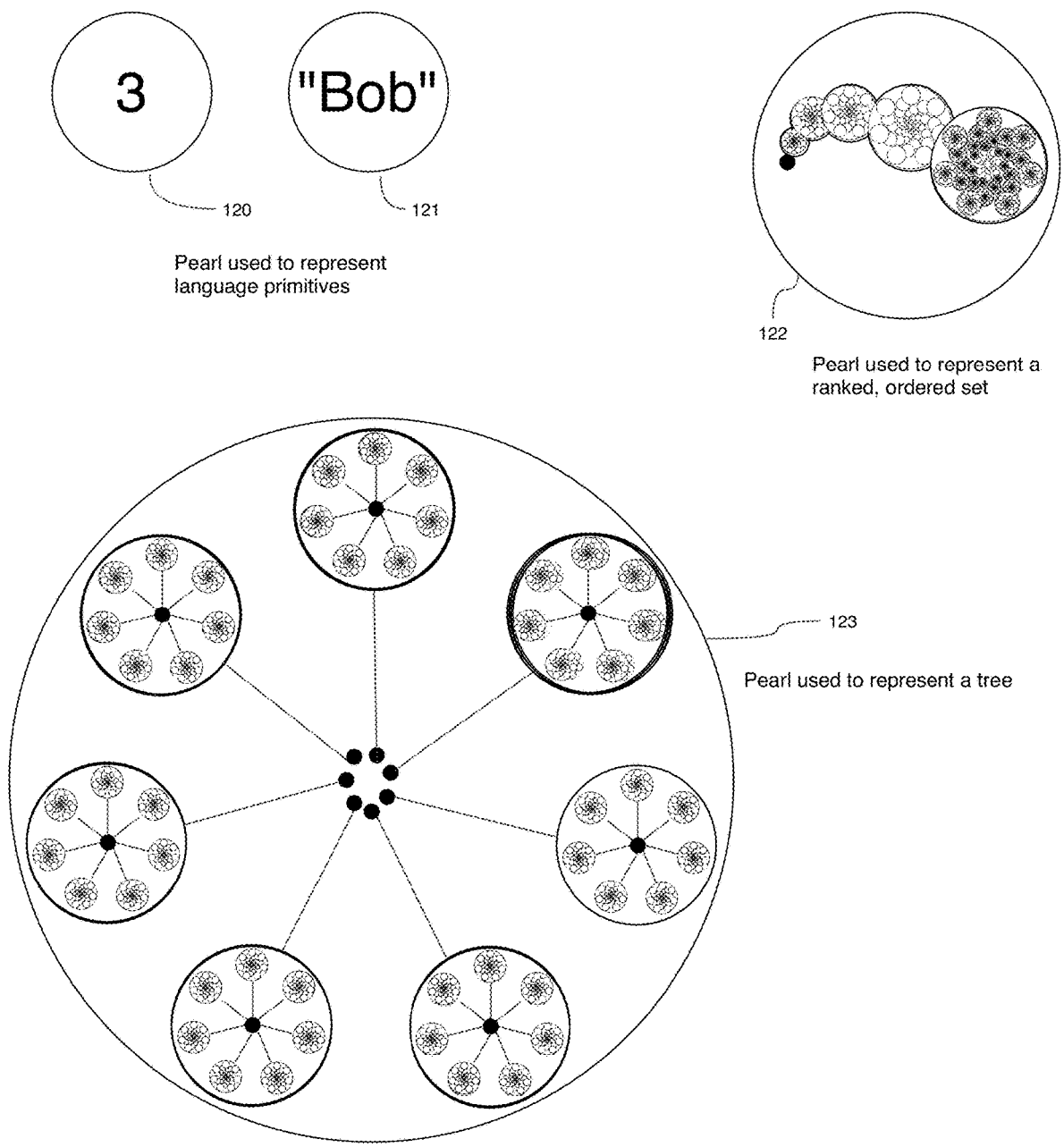
Figure 5: Pearl Variations

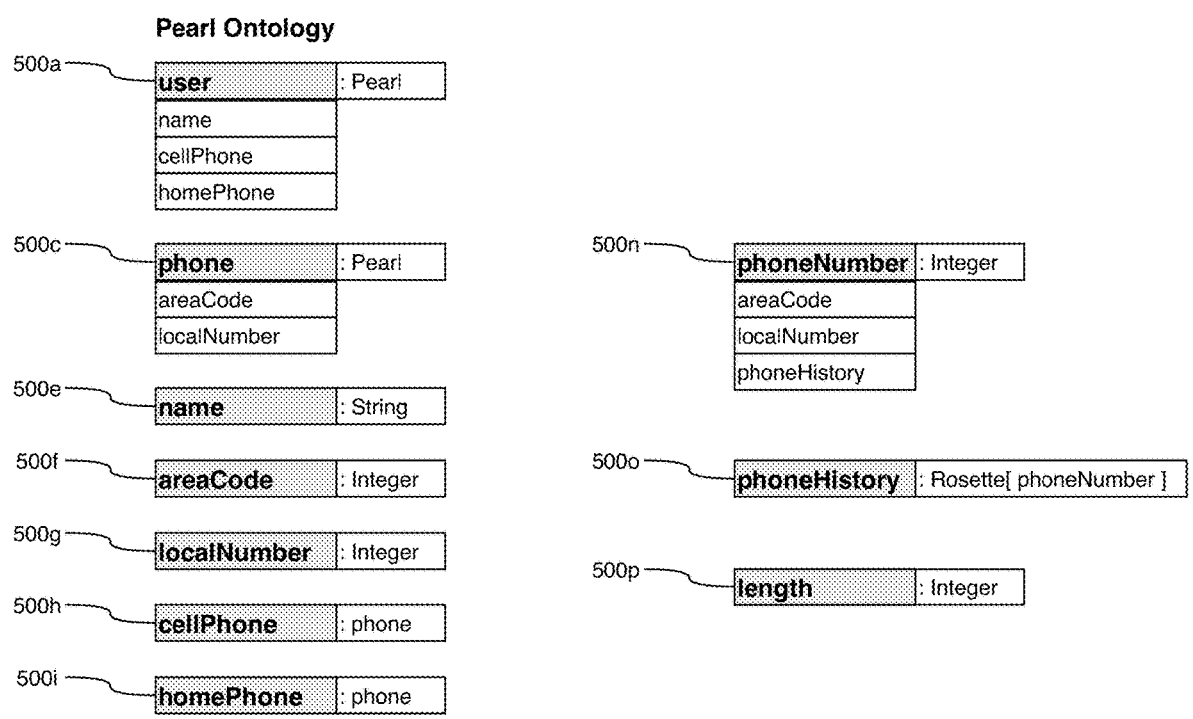
Figure 6: Structure of Pearl declarations

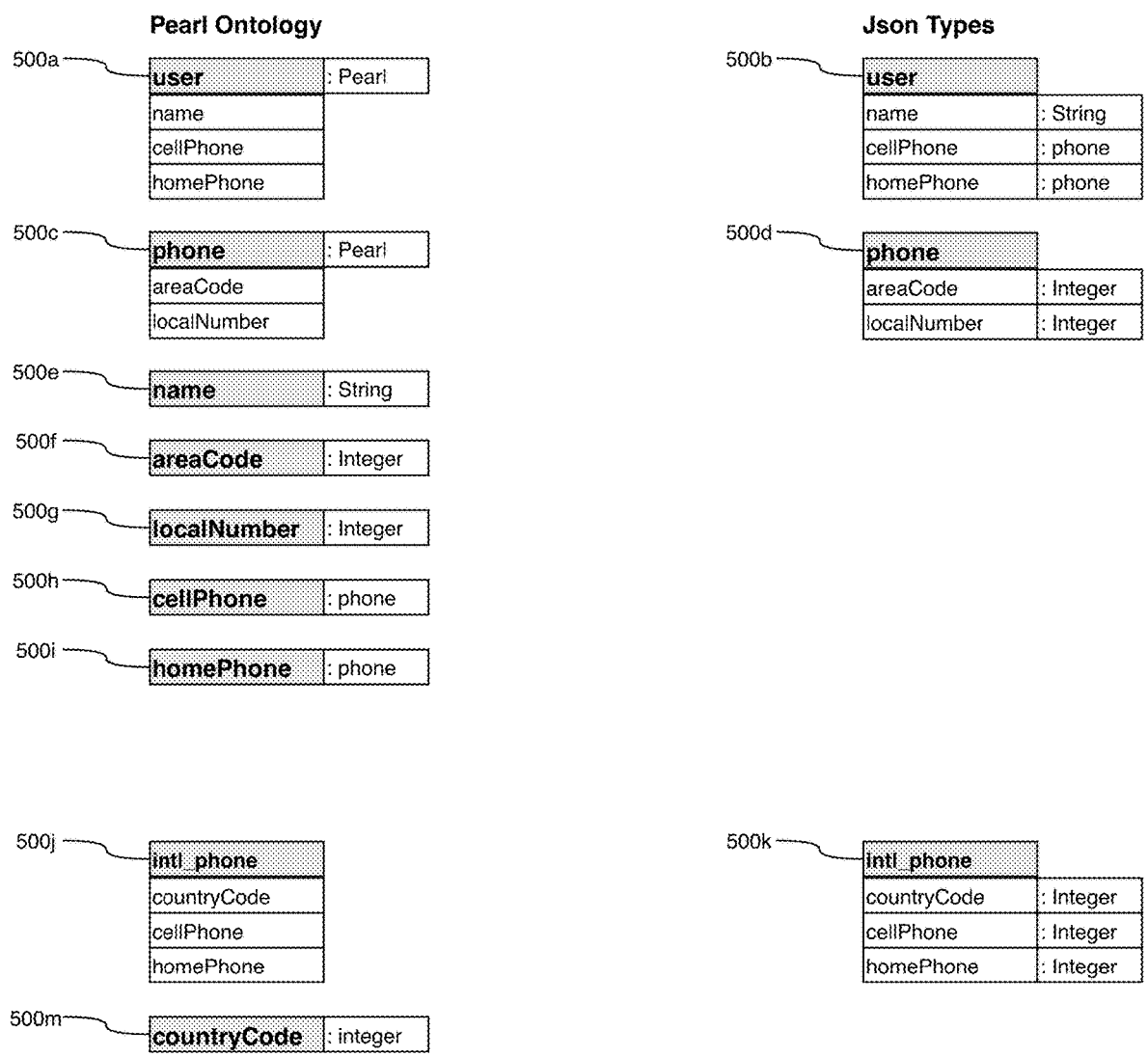
Figure 7: Pearl vs. JSON Type Comparison

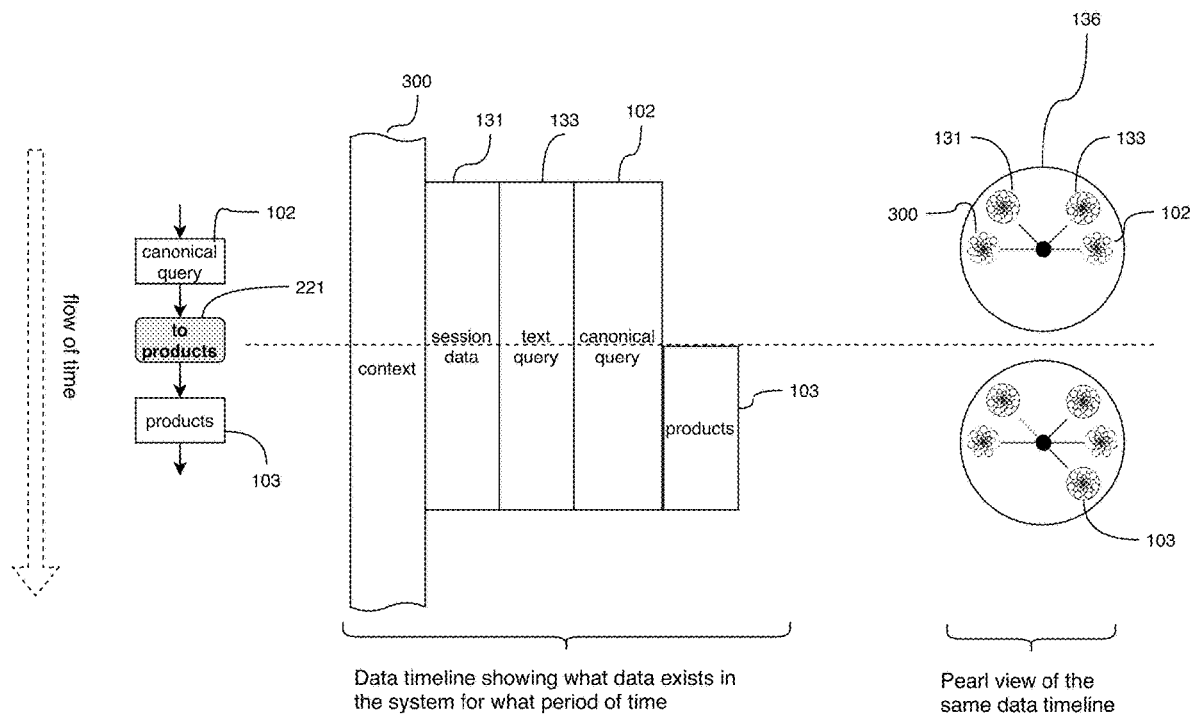
Figure 8: Translation Cell Adds New Channel of Data

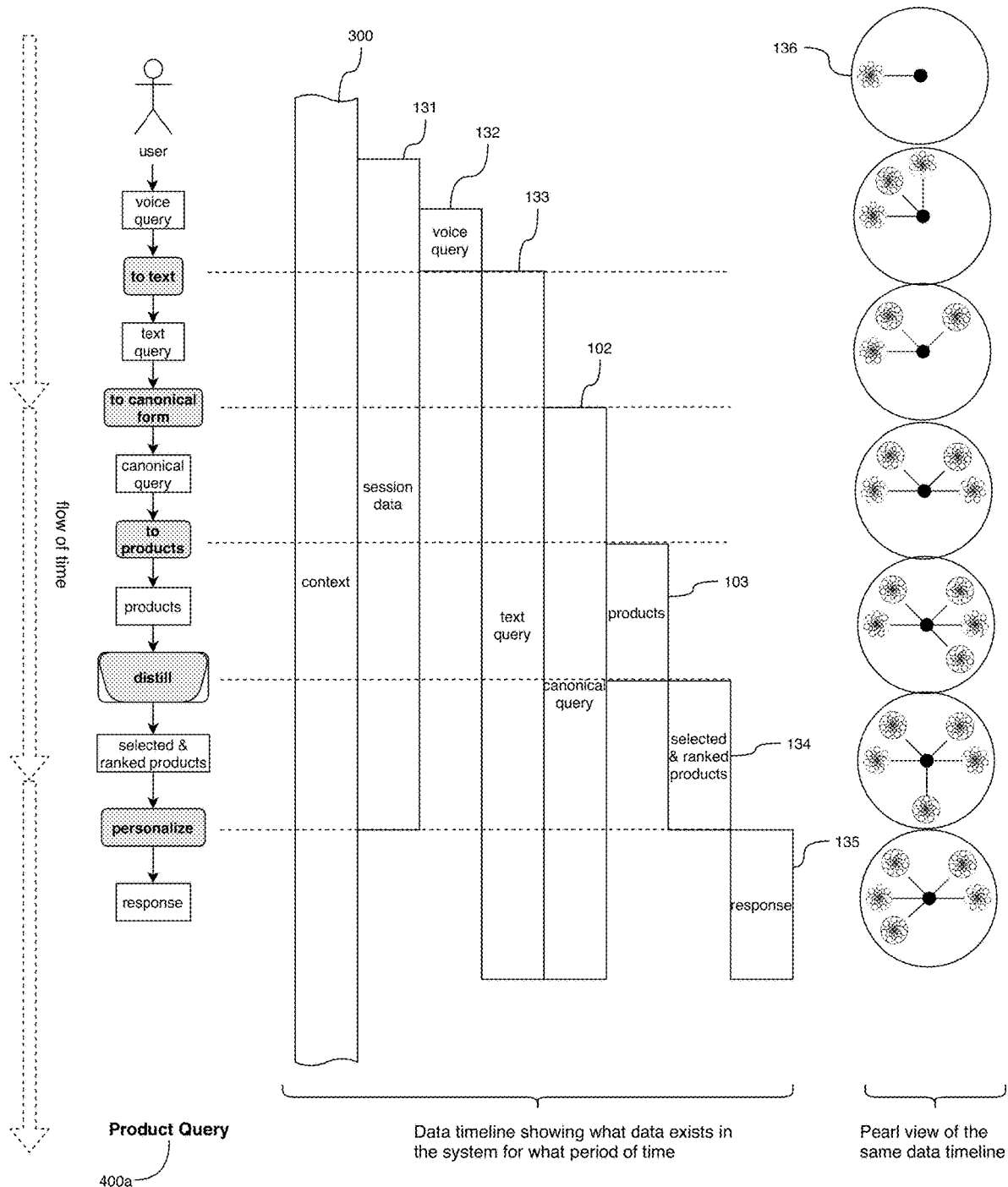
Figure 9: Data Channeling for One Service Call

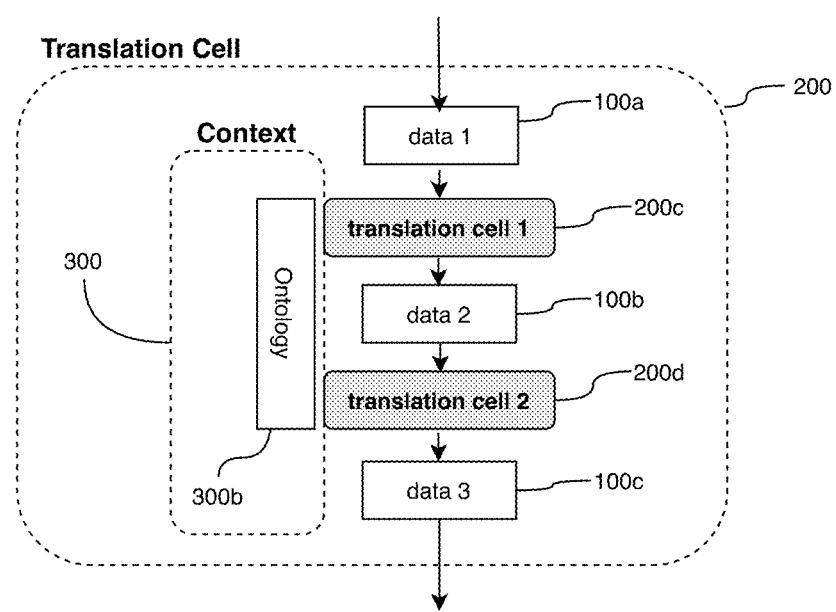
Figure 10: Translation Cells Inside Cells

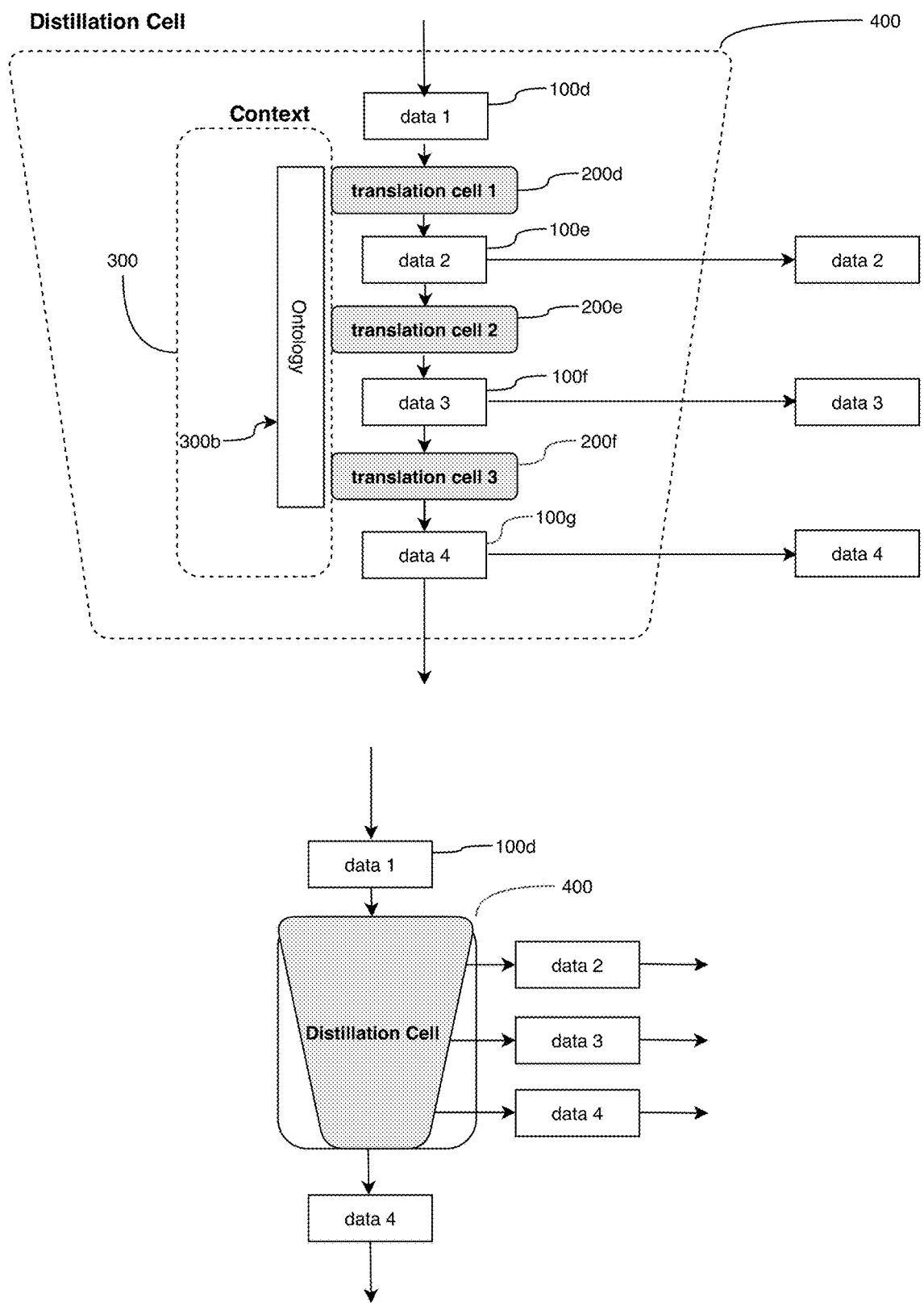
Figure 11: Distillation Cell

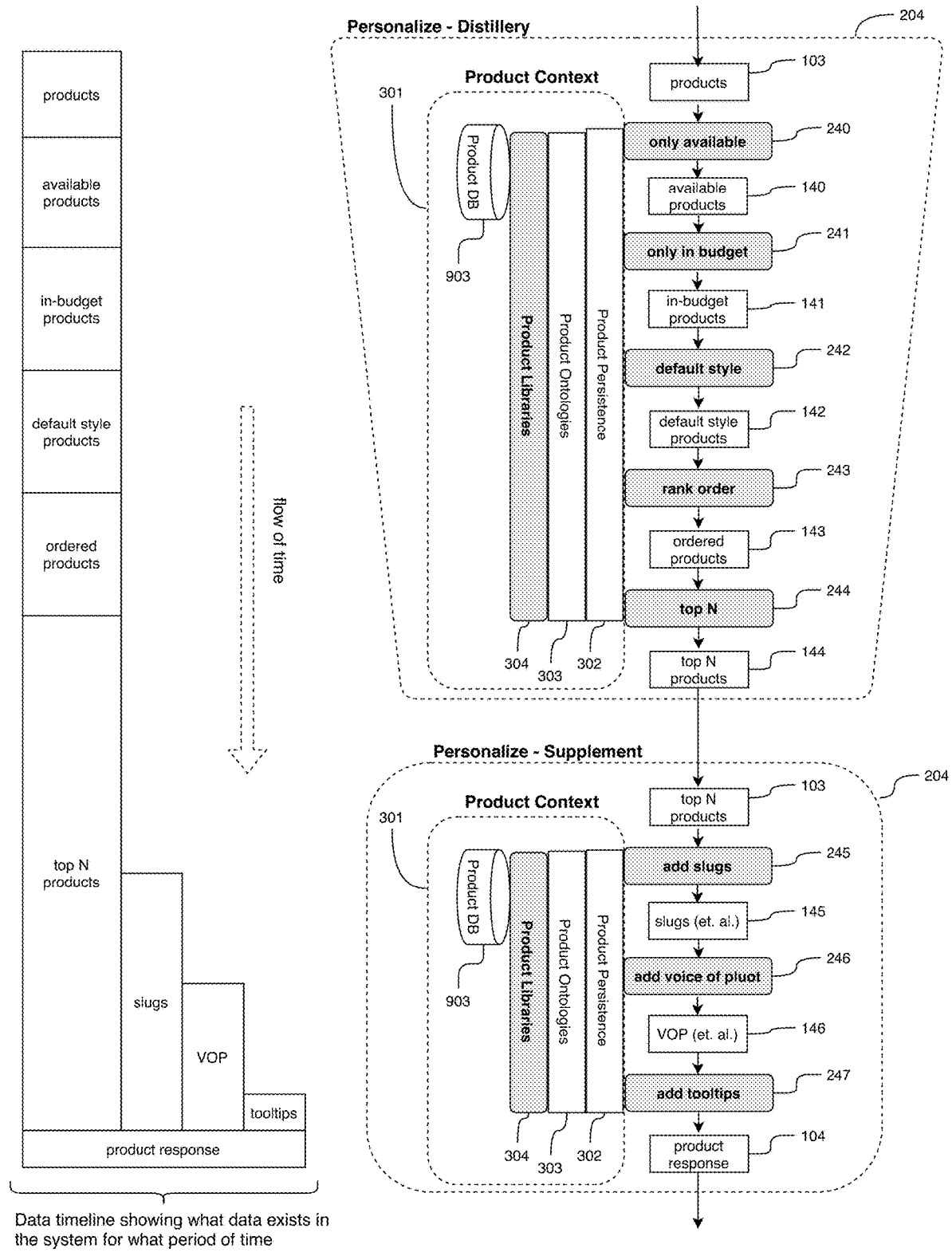
Figure 12: Pluot Running - Personalize Cell

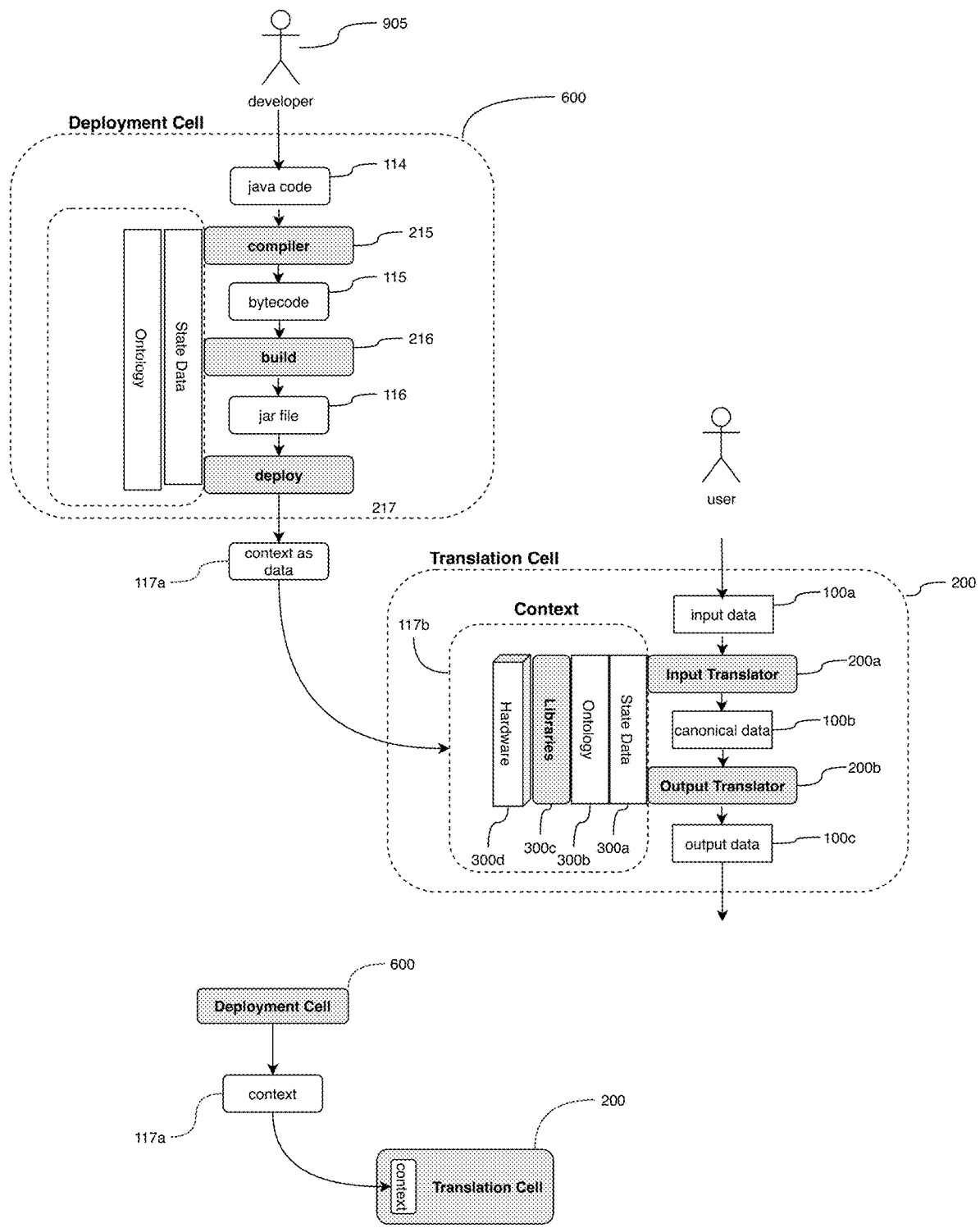
Figure 13: Deployment Cell
(data to context)

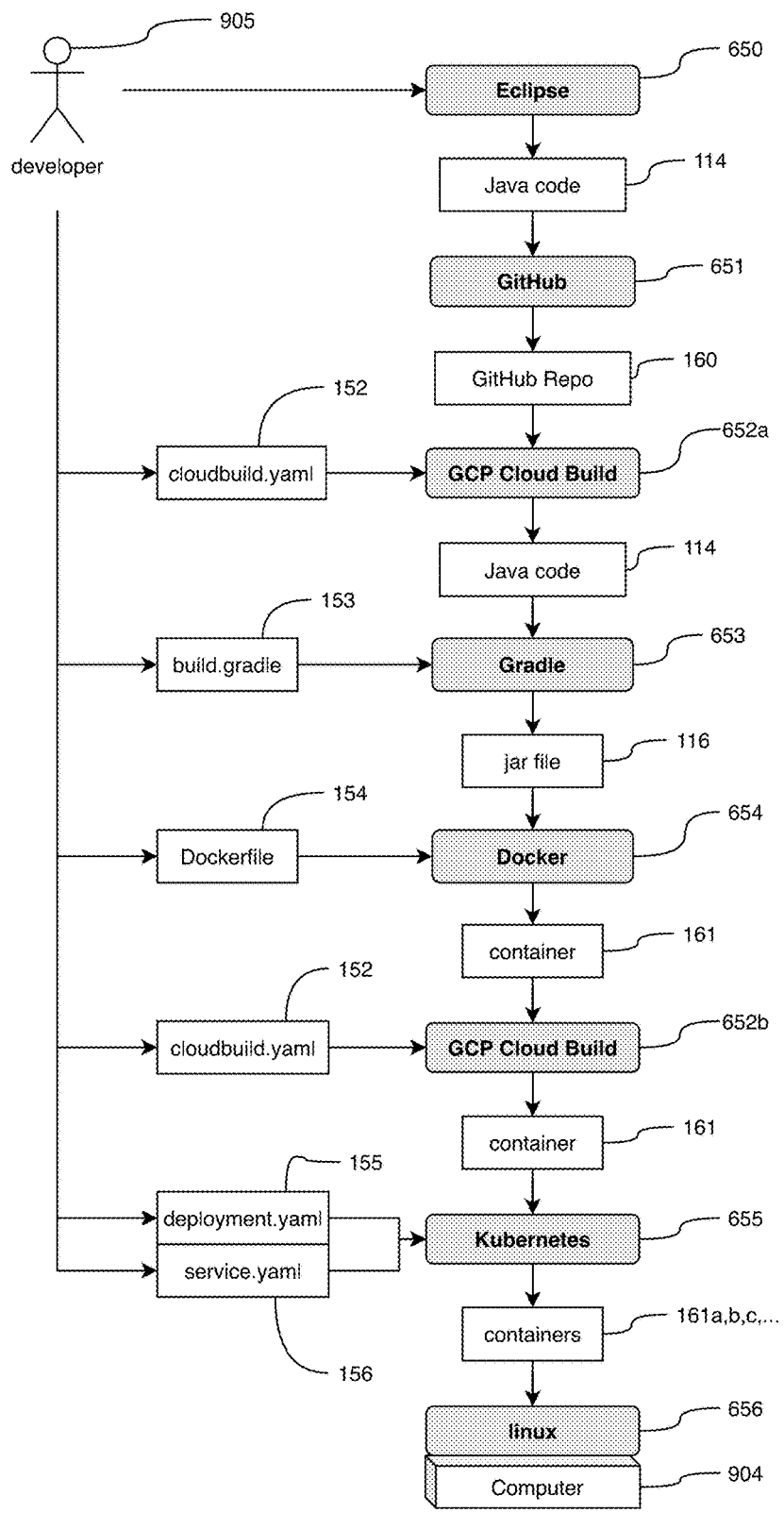
Figure 14: Pluot Running Deployment as Implemented

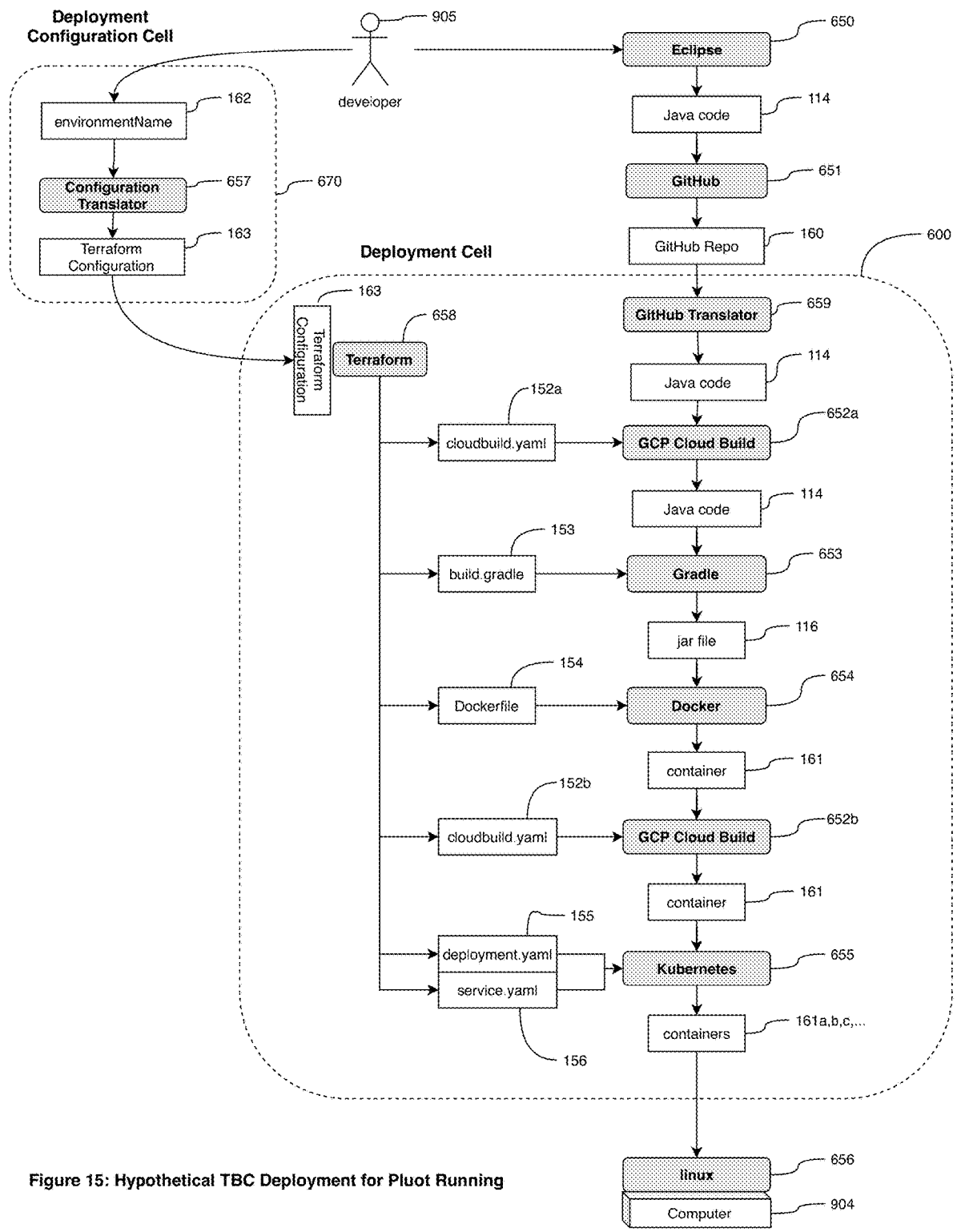
Figure 15: Hypothetical TBC Deployment for Pluot Running

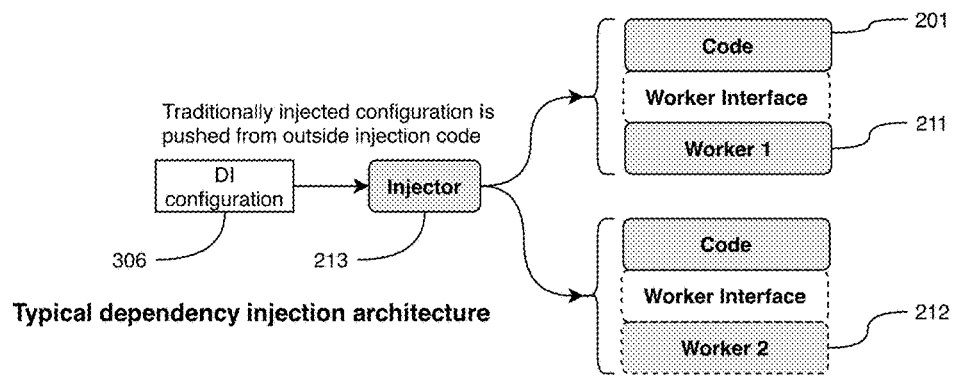
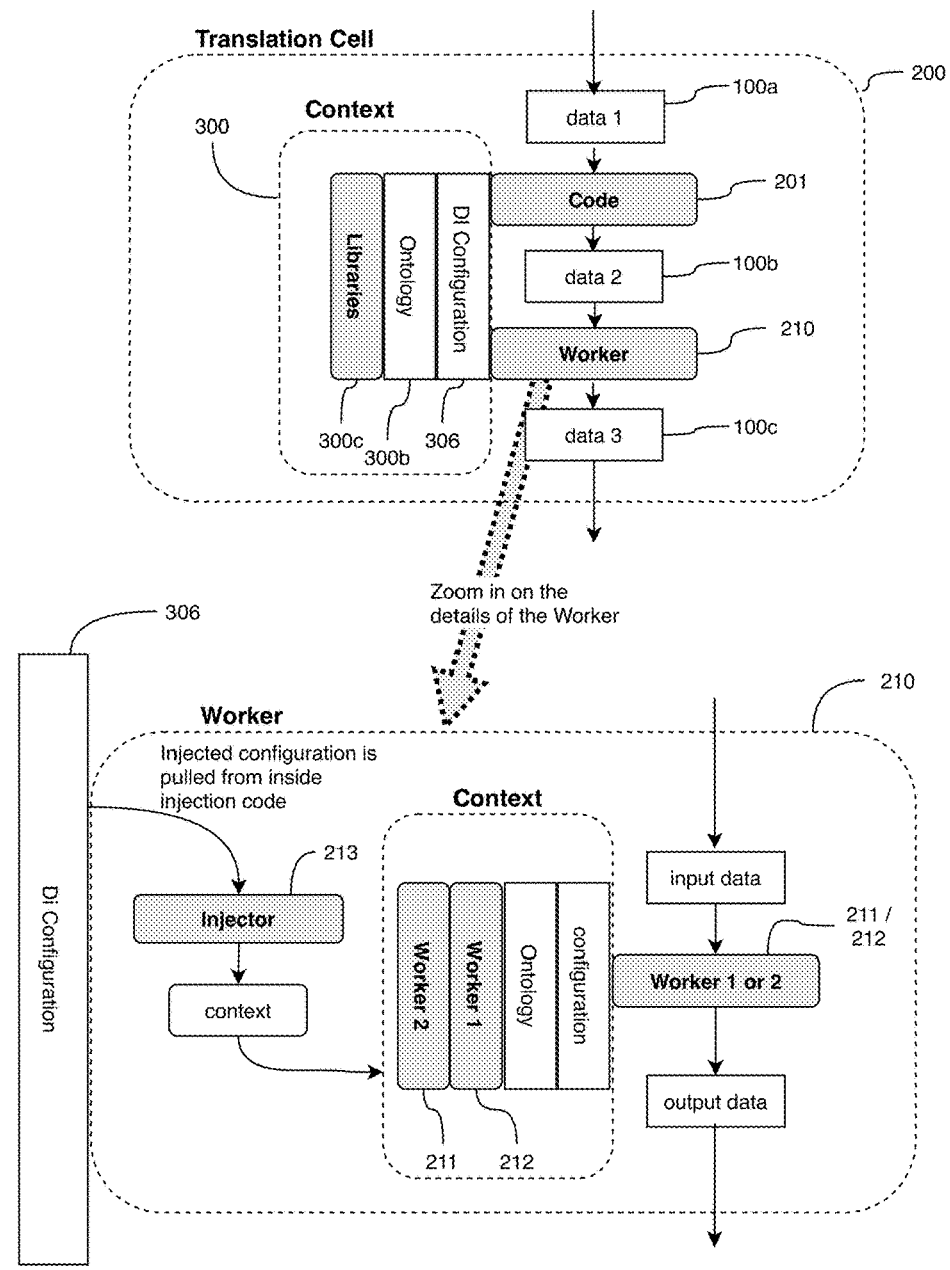
Figure 16: Dependency Injection

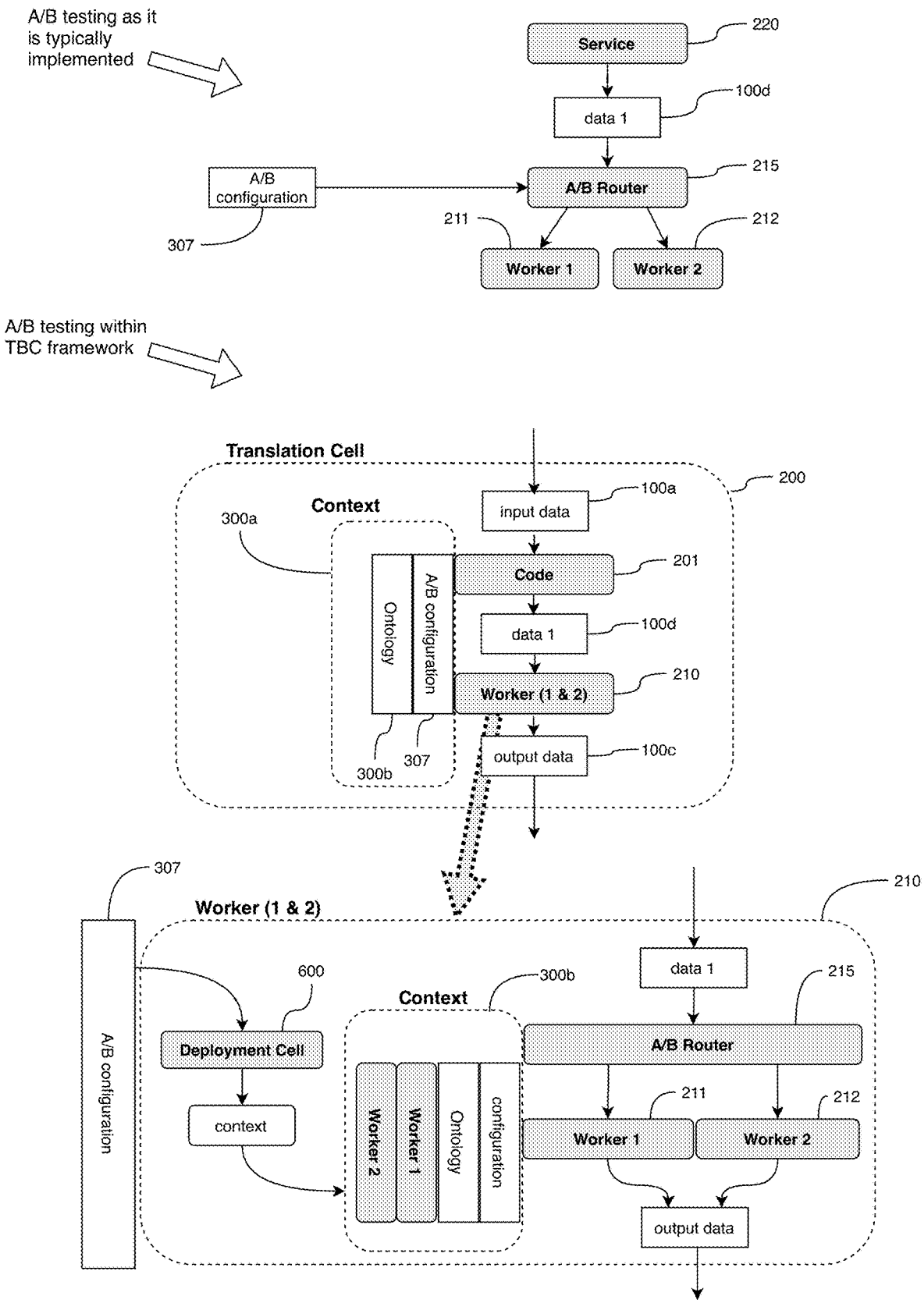
Figure 17: Implementation Selection for A/B Testing

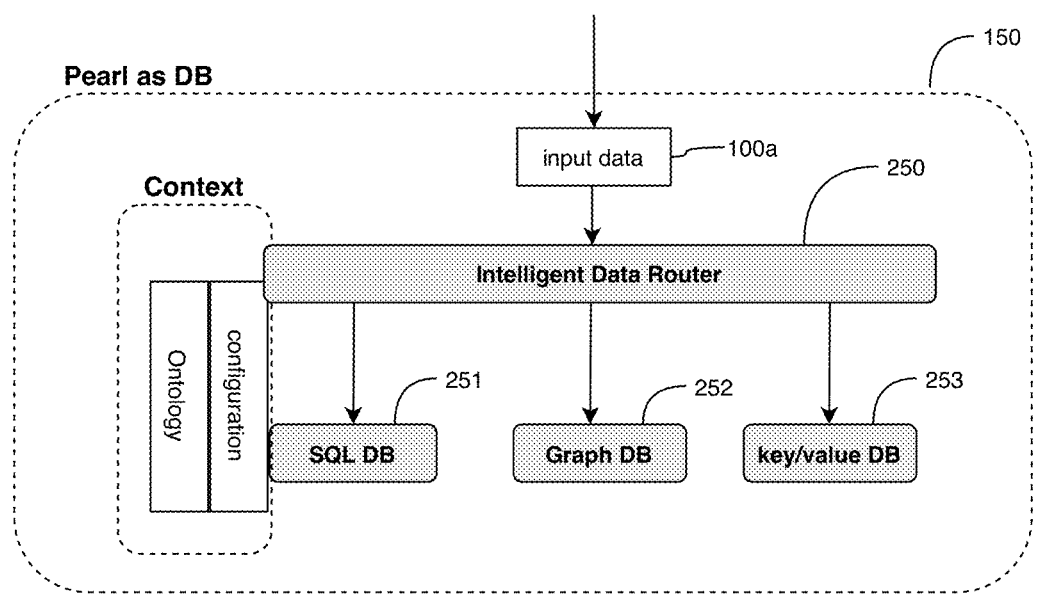
Figure 18: Implementation Selection for Intelligent Cells

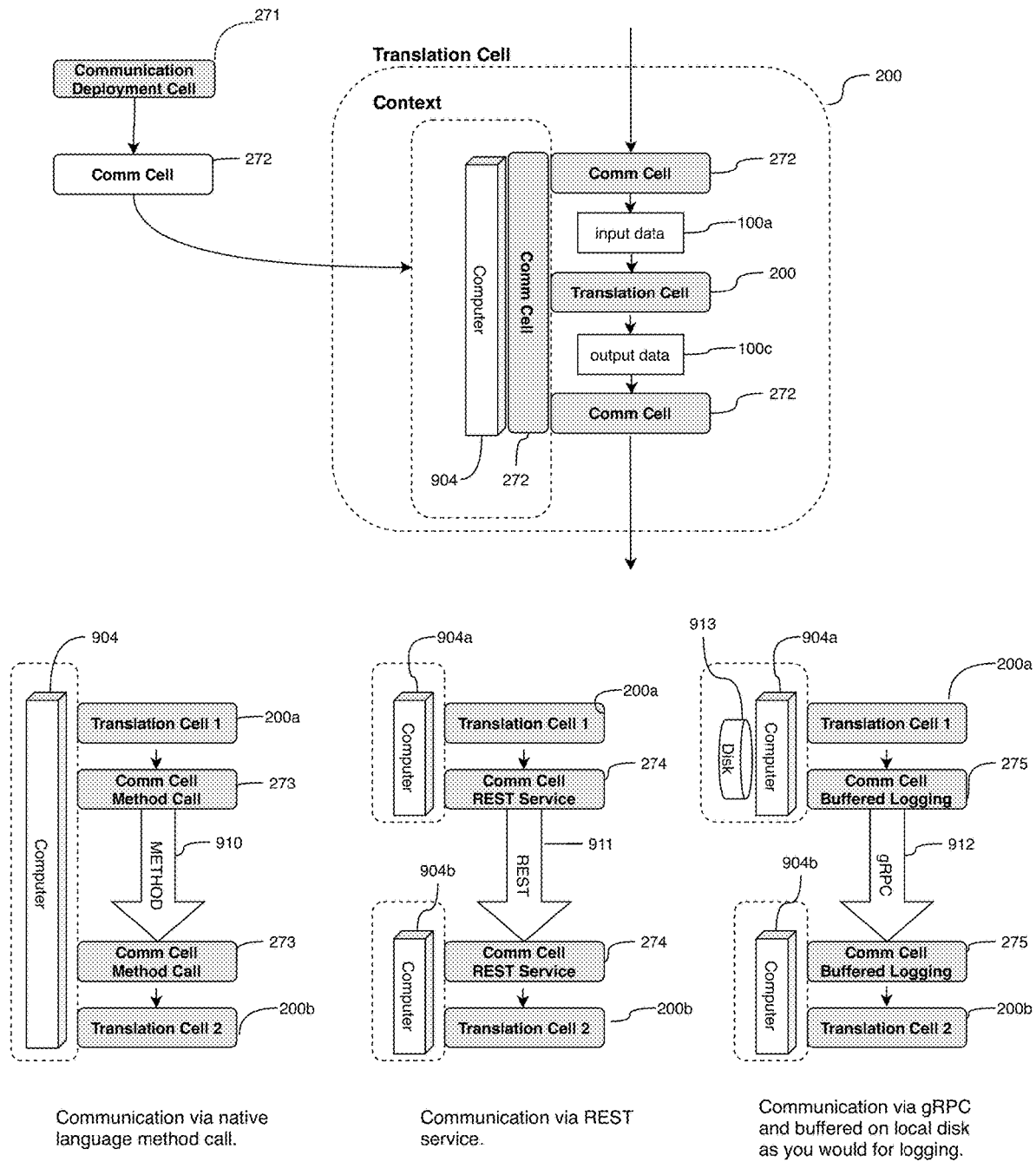
Figure 19: Implementation Selection for Communication

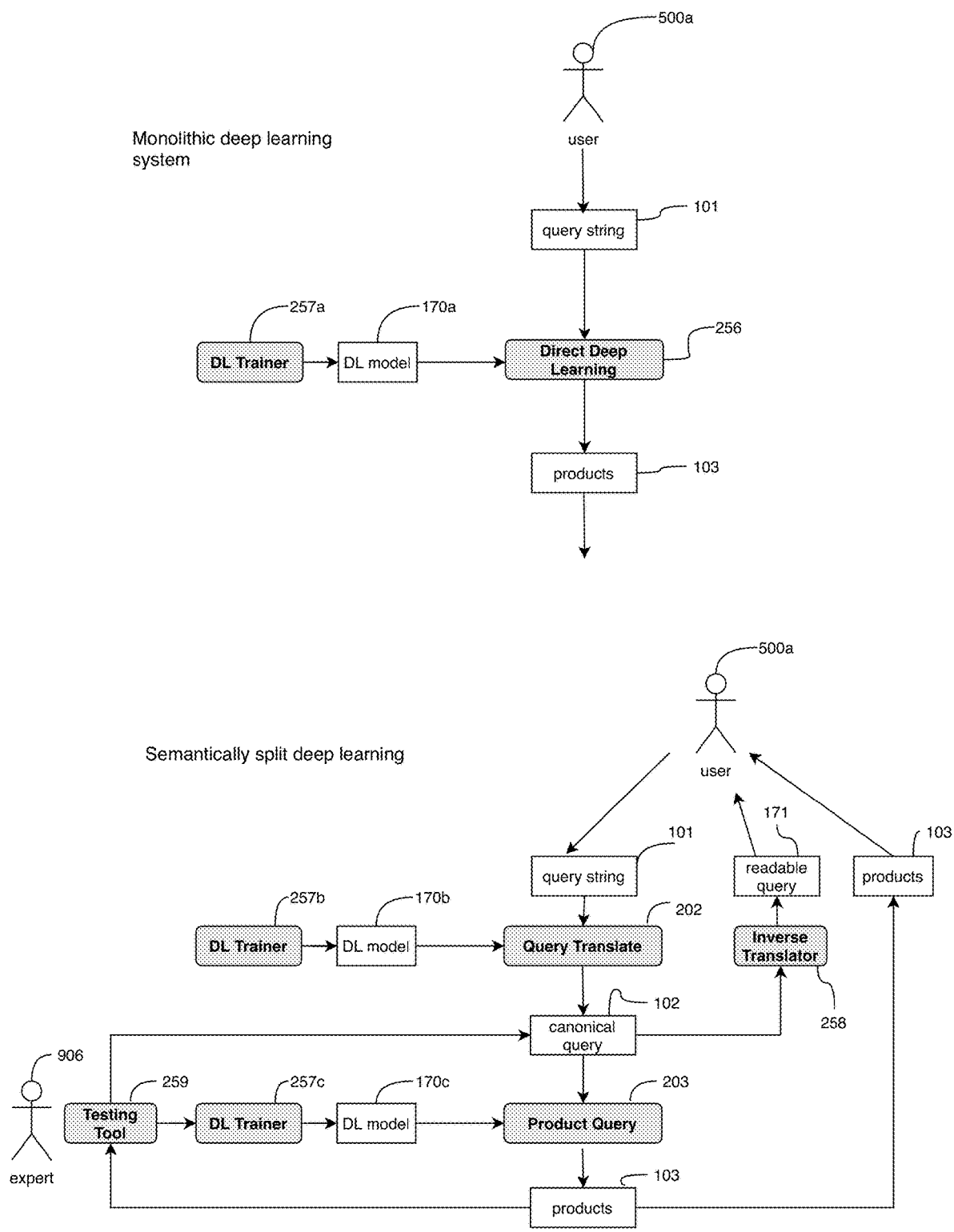
Figure 20: Semantic Splitting in TBC

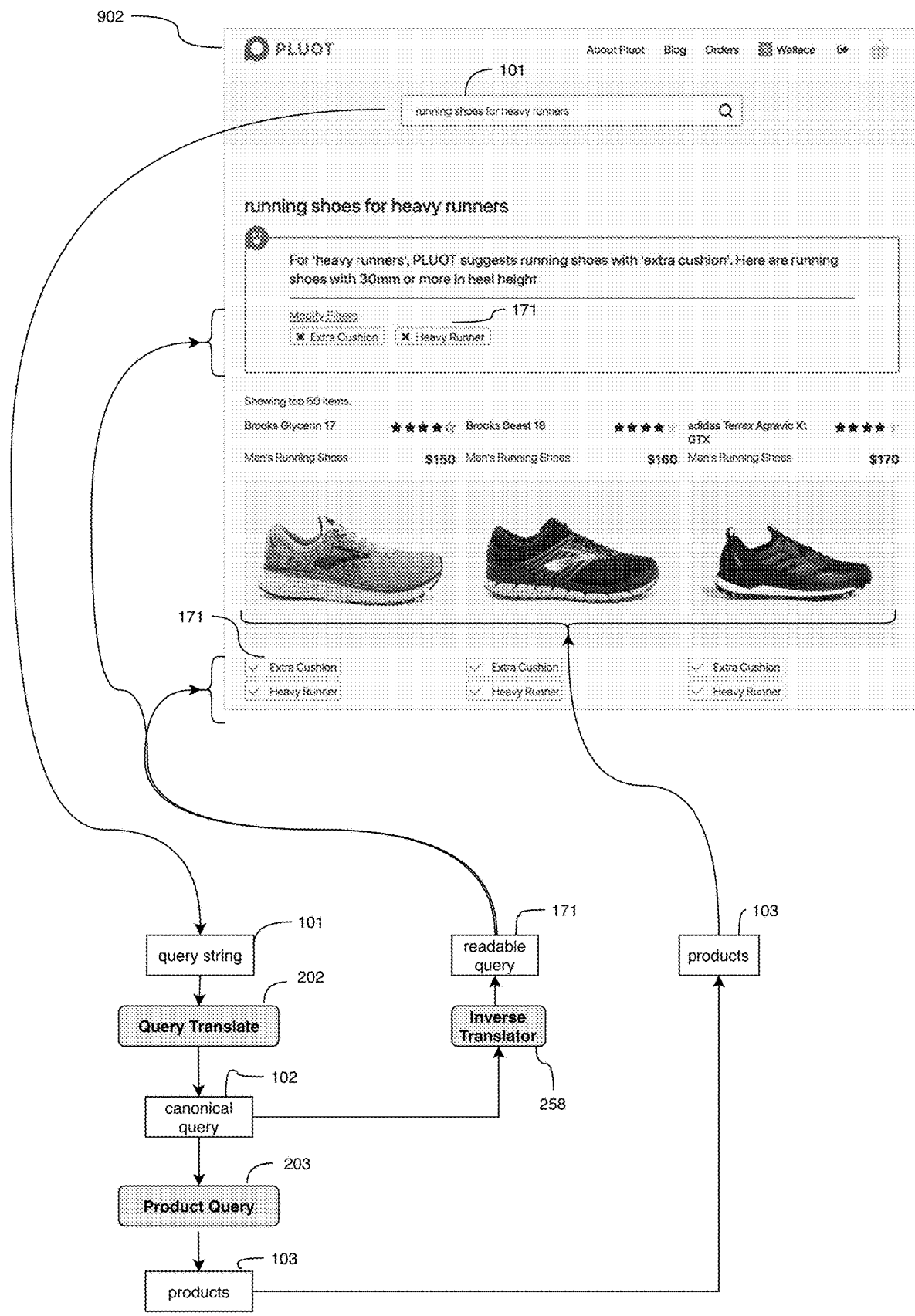
Figure 21: Pluot Running Product Search Results

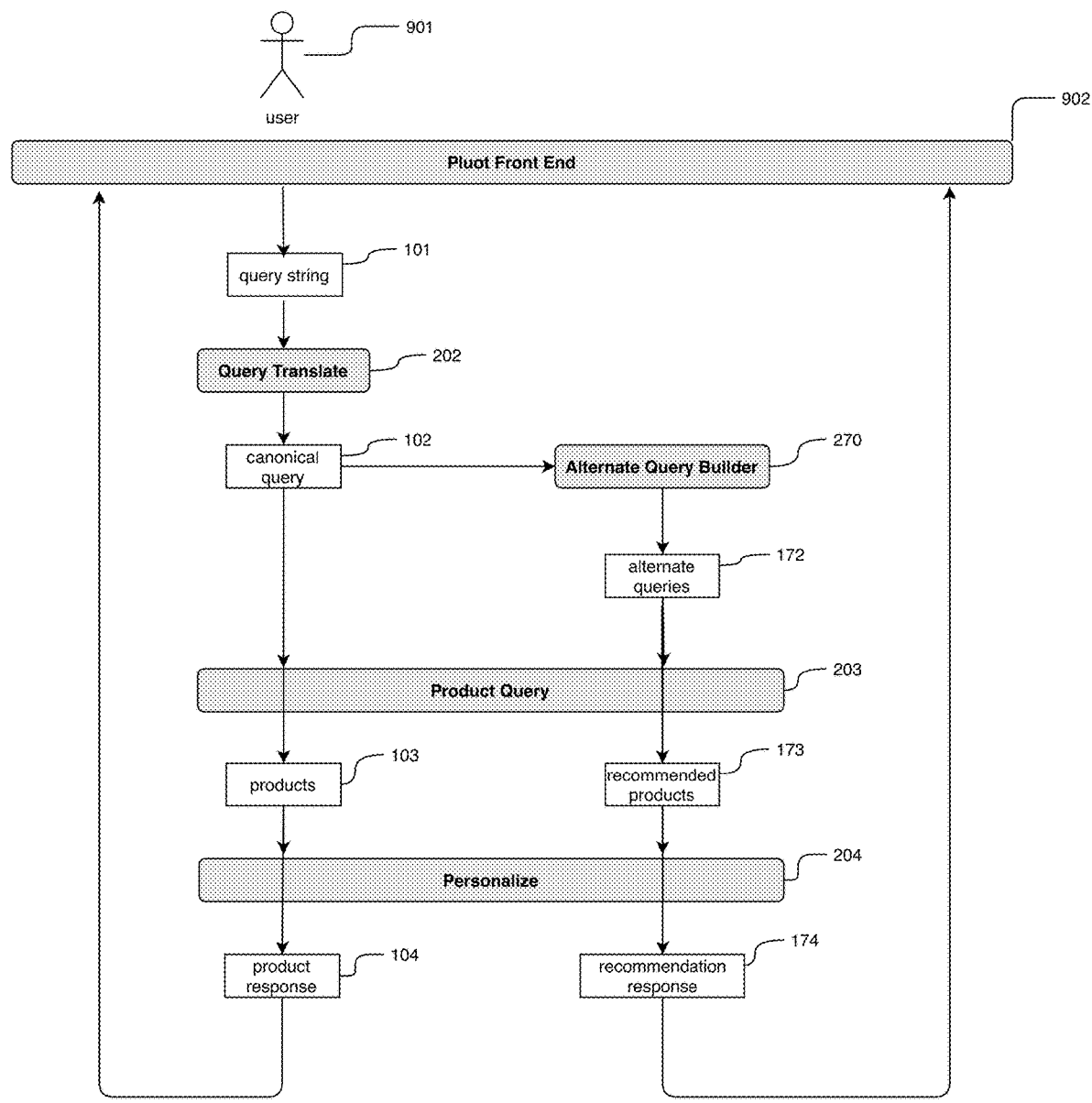
Figure 22: Implementation of Pluot Running Recommenders

Typical load distribution decouples service and data shards separately.
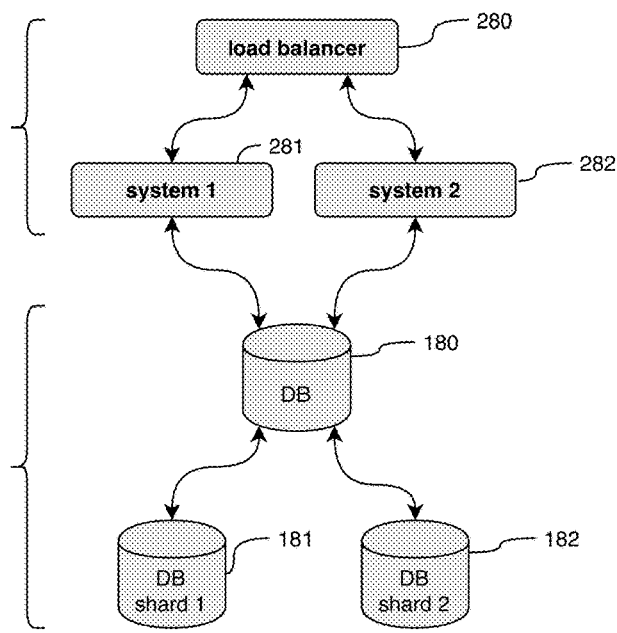
Well defined context allows up front classification and independent shards for each system.
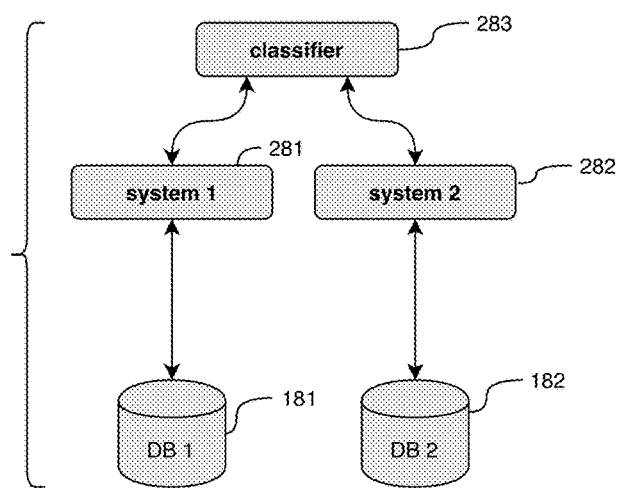
Figure 23: Typical versus TBC load distribution

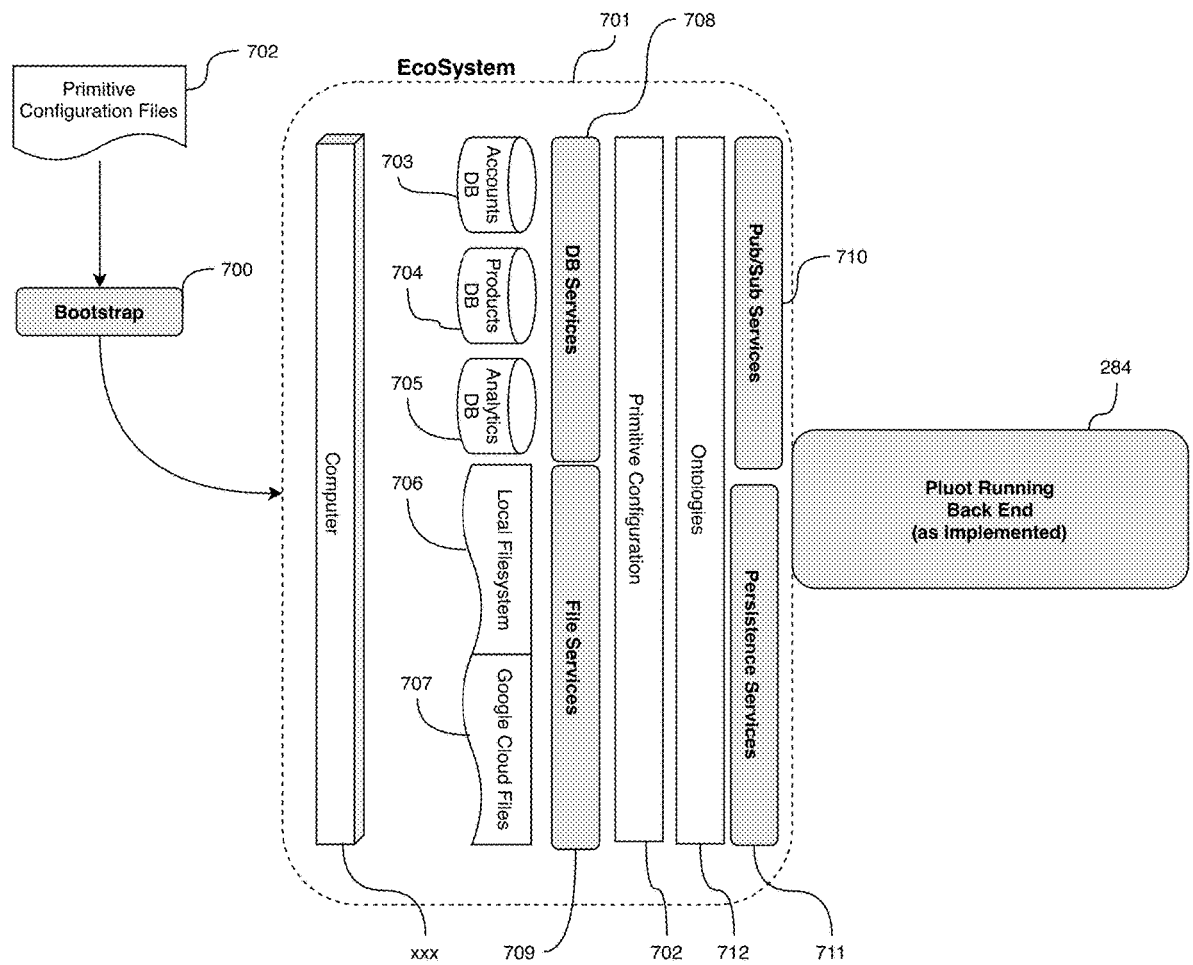
Figure 24: EcoSystem - the Outermost Context

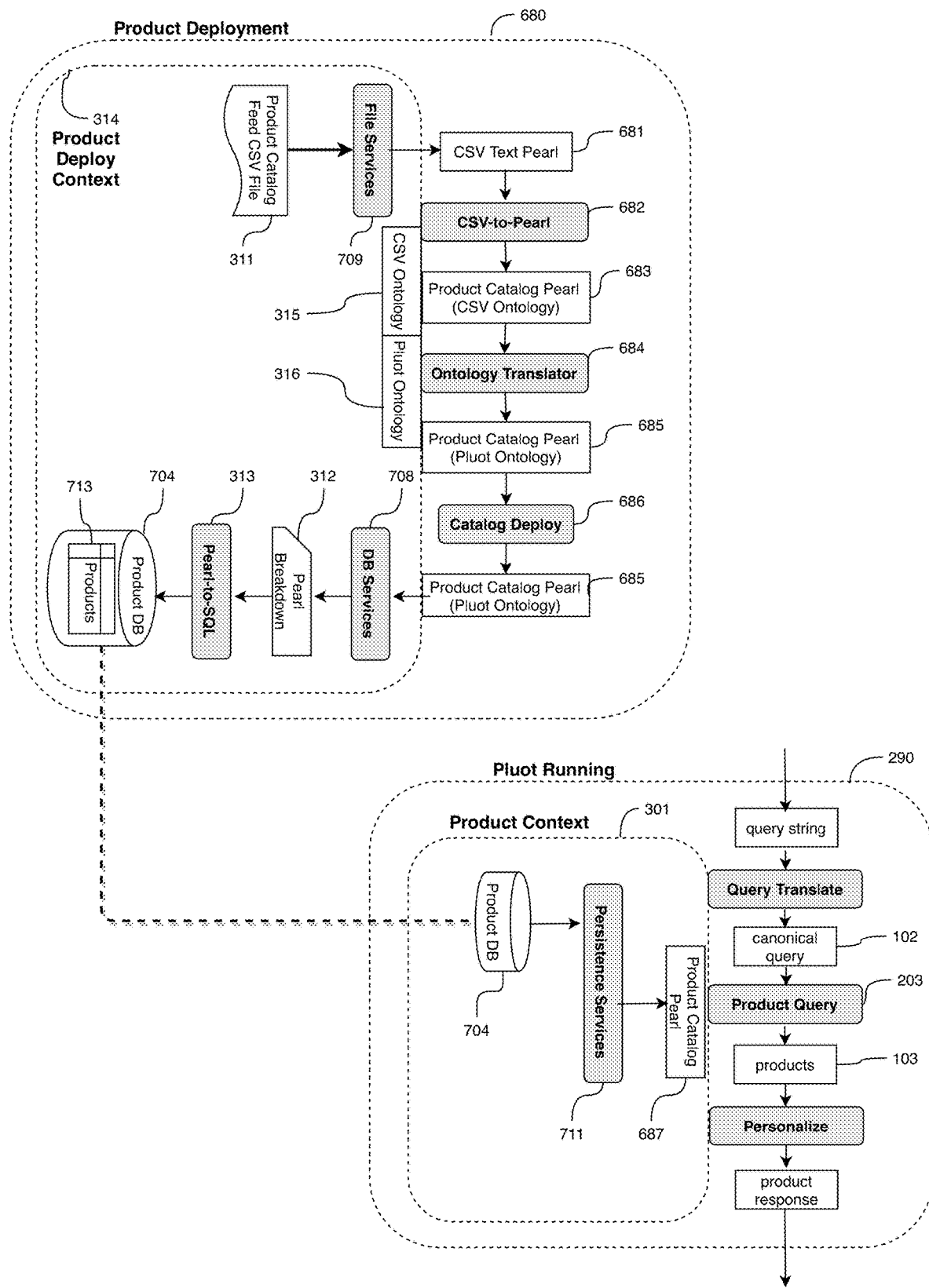
Figure 25: Persistence in Pluot Running Application

SYSTEMS AND METHODS FOR TRANSLATION BASED COMPUTING (TBC) WITH INCORPORATING ONTOLOGY AND PEARL SCHEMA

CROSS-REFERENCE TO RELATED APPLICATIONS; BENEFIT CLAIM

This application claims the benefit of provisional application 62/822,549, filed Mar. 22, 2019, the entire contents of which is hereby incorporated by reference as if fully set forth herein, under 35 U.S.C. § 119(e).

FIELD OF THE DISCLOSURE

One technical field of the present disclosure is computer system architecture. Another technical field is build processes for forming executable program files from source files during software development processes. The present disclosure also relates to software ontologies for building applications and responding to queries, and their use in computer systems that are optimized for improving builds based on translation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Typical software ontologies define code and data as separate entities where data comprises values for particular attributes where code comprises executable software commands. Additionally, data is often treated as monolithic, where a single attribute will correspond to a single value, regardless of the source of the value.

While typical software ontologies may be flexible, they often have difficulties providing context dependent translation. Often, a particular translation of a particular value will lead to the same result regardless of the context of the translation or source of the value. While systems may be configured to incorporate context into a computation, the context must be obtained from outside of the translation and applied to each computation in which contextual translation is desired. The context is thus not readily available for computations and the programming of translations to include context can be time consuming, costly, and ineffective.

Thus, there is a need for a system which can provide context based software translation in deploying software, responding to queries, and/or communicating between disparate systems.

SUMMARY

The appended claims may serve as a summary of the disclosure.

BRIEF DESCRIPTION OF THE DRAWINGS

In the drawings:

FIG. 1 illustrates examples of Translation Based Computing (TBC) implementations.

FIG. 2 illustrates a single translation cell.

FIG. 3 is a high level diagram of an example running application.

FIG. 4 is a visualization of the implementation of a Pearl, inspired by Romanesco Brocolli.

FIG. 5 is a visualization of the different forms of Pearls.

FIG. 6 shows the structure of Pearl declarations for a phone number example.

FIG. 7 shows a comparison of the difference between how instance and attribute typing is handled in pearls versus JSON and typical object oriented data.

FIG. 8 shows how data channeling works in detail for a single cell adding a single new channel.

FIG. 9 shows how data can be created and removed in channels as it flows through the system.

FIG. 10 illustrates how code inside of translation cells can itself be implemented as a translation cell.

FIG. 11 depicts a distillation cell architectural pattern implemented as a series of translation cells.

FIG. 12 illustrates the details of the Personalize translation cell in the example running application.

FIG. 13 shows how TBC code deployment can be included in the TBC framework itself.

FIG. 14 depicts a simplified view of the example running application deployment implementation as it was built.

FIG. 15 depicts a hypothetical example of a TBC implementation of example running application deployment.

FIG. 16 shows how TBC implements dependency injection.

FIG. 17 illustrates how TBC uses implementation selection (based on dependency injection) for A/B testing.

FIG. 18 shows a hypothetical intelligent cell based on implementation selection.

FIG. 19 illustrates how implementation selection can be used to abstract away different forms of communication.

FIG. 20 is a view of how semantic splitting can break up a single deep learning network into multiple networks and the advantages for testing and training.

FIG. 21 illustrates how semantic splitting on example running application presents both product search results and the system's translation of the original query.

FIG. 22 shows a simplified view of how example running application recommendations make use of the same engine as search query.

FIG. 23 compares a typical load distribution architecture with a TBC architecture enabled by a well defined context and ontology.

FIG. 24 illustrates the EcoSystem, or outermost context which is created by the bootstrap process.

FIG. 25 shows a detailed example of product catalog persistence in the example running application.

DETAILED DESCRIPTION

Figure 26:
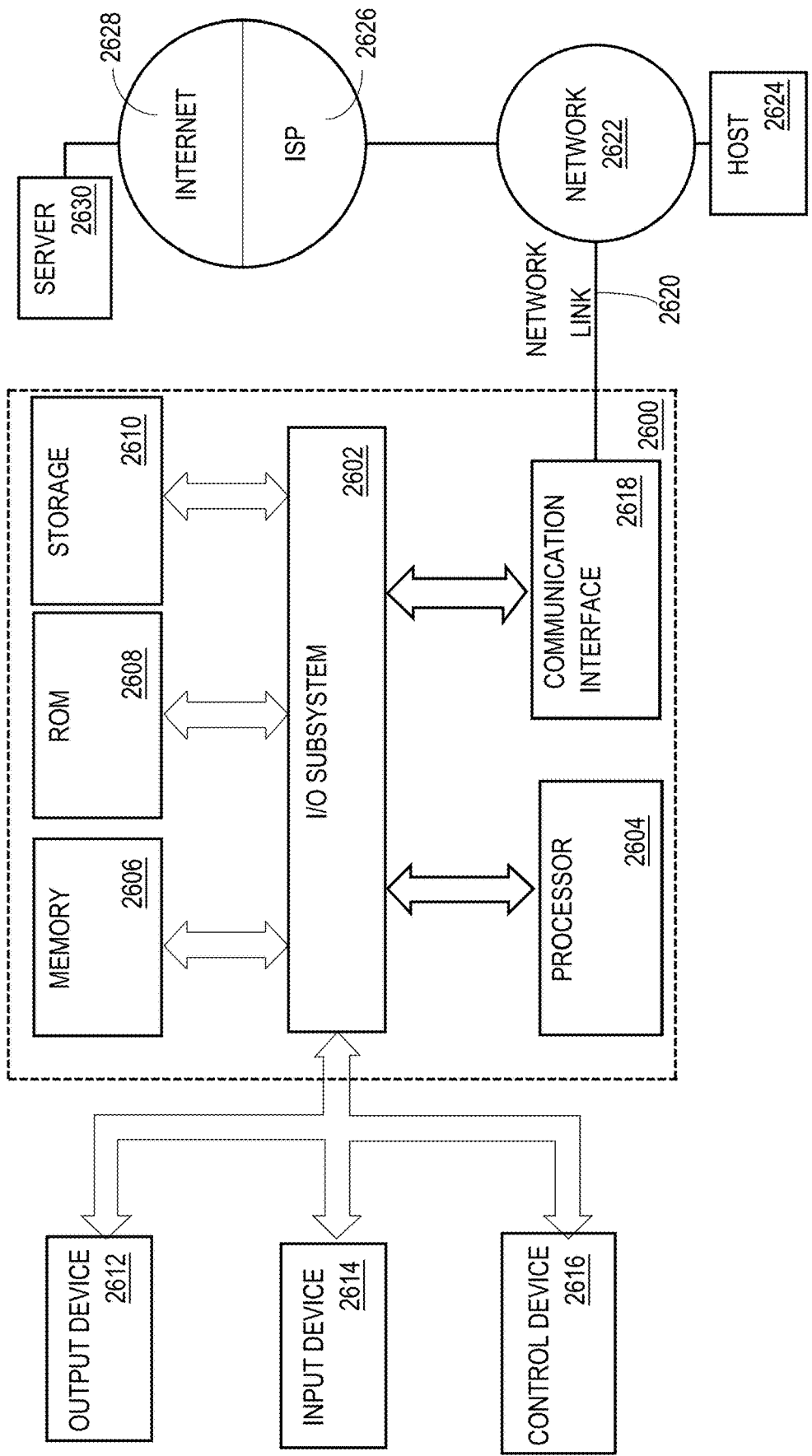
FIG. 26 is a block diagram that illustrates a computer system upon which an embodiment may be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

1. General Overview

Translation Based Computing (TBC) is a hybrid software framework for building applications with the following characteristics: finite and known domain information (e.g., text, image, video, data); finite, namable concepts that have semantic meaning (e.g., product, color, size, weight); finite systems, inputs, actions and outputs; input/output operations that preserve essential meaning and user intent, but forgiving of the loss of detail and nuance.

The advantage of TBC over prior art is improved emergent application behavior, reduced software complexity and reduced operational cost.

TBC is a coherent hybrid of deep learning, semantic reasoning and traditional programming techniques.

Examples of some applications that can be built using TBC can be seen in FIG. 1. The figure shows an abstract, high-level translation flow of three different applications. These applications share similar abstract TBC architectures, even though the final, low-level deployments would be very different. The product query 400a application translates a voice query into a list of products and would run on cloud services like GCP or AWS. A hypothetical pool controller 400b translates voice commands into the pump operations and would be deployed into an embedded, micro-controller environment.

An imagined NotATroll.com 400c application is an enterprise application wrapping Google login and guaranteeing that the user does not have an internet history of acting like a troll.

1.1. Translation Based Computing

In this disclosure, Translation Based Computing (TBC) is a software paradigm based on converting data in a finite domain from one form to another that preserves essential meaning and user intent but is forgiving of the loss of detail or nuance where an exact translation is not possible or desirable.

Borrowing from human languages as an analogy, the use of the word translation in this context is closer to the concept of interpretation. A simultaneous interpreter does not attempt a thorough translation of the material, but rather ensures that the core meaning is translated quickly and accurately.

Whereas a simultaneous interpreter always converts words from one human language to another, translation based computing can convert data from one ontology (i.e., semantic language) to another, or from one form to another within a common ontology.

The translation may be invertible or not. That is, it may be possible to translate from one form to another and back again without loss of meaning. It may also be that the translation can only be done in one direction.

1.2. Translation Cell

Translation cells (aka 'cell') are the basic unit of computation in TBC. A cell is defined as the triad of context, data and code as shown in FIG. 2. Each of context, data and code are first class citizens and always explicitly defined.

The encapsulation of context, data and code into a coherent cell is novel to TBC over prior art.

FIG. 2 shows the generic components for a translation cell 200. The input data 100a is first converted into an intermediate, canonical data 100b by an input translator 200a. The canonical data 100b is subsequently converted to output data 100c by the output translator 200b. The input translator 200a and output translator 200b both have access to the context 300 and all of its components: state data 300a, the ontology 300b, software libraries 300c and the computer hardware 300d upon which the code runs.

For any specific translation cell 200 the components of context 300 can vary. For example, it would be rare for hardware 300d to be exposed as shown except in cases where the translation cell 200 was in fact a cell that deployed code (as data) onto a specific piece of hardware. In addition the processing steps can vary from cell to cell, containing more or fewer processing components with different functions. The elements shown in FIG. 2 are intended to establish a language and pattern that will be expanded upon subsequently.

From the perspective of the flow of data from input data 100a to output data 100c as pictured in FIG. 2, TBC behaves according to a functional programing paradigm and treats data as immutable. The input translators 200a and 200b do not retain their own state between successive invocations of translation cell 200. The input and output translators 200a and 200b also do not modify their incoming input data 100a or 100b respectively. All state is encapsulated in state data 300a within context 300.

The remainder of this disclosure will use variations of translation cells 200 as the basic building blocks out of which entire systems can be constructed.

1.3. Hybrid Framework

Translation Based Computing (TBC) is a hybrid framework combining multiple programming paradigms.

The core hybridization of TBC is the combination of deep learning, semantic reasoning and procedural programming.

The methods described herein improve the ability of the computing system to process incoming requests by allowing communication between the disparate technologies of deep learning, semantic reasoning, and procedural programming.

1.4. Implementation Example: Example Running Application

Translation Based Computing (TBC) has been reduced to practice for the building of an example running application as shown in FIG. 3. The example running application is a mobile web experience to assist runners, focusing on a translation-based e-commerce. This example will be used throughout this disclosure to illustrate in concrete terms how TBC concepts can be applied. Note that the example running application is an application built with an early embodiment of TBC; the application is not the embodiment of TBC itself.

As shown in FIG. 3, user 901 submits a query to describe the desired products to show at the front end 902. The front end 902 transmits the query string 101 to the example running application 201 service running on a computer 904. The entire example running application 201 is architected as a single translation cell. For reference see the generic translation cell 200 shown in FIG. 2.

Inside of example running application 201 the query string 101 is converted into a canonical query 102 by translation cell query translate 202. The canonical query 102 is translated into a list of products 103 by product query 203. Finally the module personalize 204 converts the list of products 103 into a final product response 104, which is returned to the front end 902.

All state of the system is encapsulated in product context 301. The context encapsulates access to product state (e.g., product catalog, current inventory and prices, product images, etc.) in application product persistence 302. The data itself may be stored directly in computer 904 memory, in product database 903, or anyplace else, but access is universally granted to the application only through product persistence 302. The schema for that data is described in the product ontologies 303. Third party libraries are available through product libraries 304.

This example will be referenced repeatedly in this disclosure to make abstract concepts more concrete. Again, the example running application 201 is not in and of itself an embodiment of the framework itself, but rather an example of an application that can be built with embodiments of the framework.

In an embodiment, a method comprises storing an ontology comprising: one or more translation cells comprising context data and software code; and a plurality of pearl schema nodes, each of which defining one or more attributes in the ontology; receiving input data at the one or more translation cells; using the context data of the one or more translation cells, translating the input data into canonical data; using the context data, translating the canonical data into output data; providing the output data to a client computing device.

In an embodiment, the plurality of pearl schema nodes comprises one or more of a pearl primitive node, pearl tree, or pearl rosette.

In an embodiment, a particular pearl node of the plurality of pearl nodes comprises an attribute value and acts as an interior node to another pearl node of the plurality of pearl nodes.

In an embodiment, an attribute of first pearl schema node of the plurality of pearl schema nodes comprises a second pearl node of the plurality of pearl schema nodes.

In an embodiment, the one or more translation cells comprises a particular pearl schema node comprising context data and session data; the input data comprises a voice query; translating the input data into canonical data comprises translating the voice query to a text query, removing the voice query from the particular pearl schema node, translating the text query into a canonical query, and storing both the text query and the canonical query in the particular pearl schema node; translating the canonical data into output data comprises generating a response to the canonical query based, at least in part, on the session data, and removing the session data from the particular pearl schema node; and providing the output data to the client computing device comprises responding to the voice query with particular pearl schema node comprising the context data, text query, canonical query, and generated response.

In an embodiment, a particular pearl schema node of the plurality of pearl schema nodes is mutable and the method further comprises receiving a request to seal the particular pearl schema node; and augmenting the particular pearl schema node to be immutable.

In an embodiment, the method further comprises receiving a request to deploy code on a particular computing device; and generating context data using the request to deploy code on the particular computing device and, in response, storing the context data in the translation cell.

In an embodiment, translating the canonical data into output data comprises instantiating one or more workers, the one or more workers comprising a worker interface comprising implementation details of the one or more workers and dependency injection data.

In an embodiment, the worker interface further comprises an A/B configuration which switches between directing traffic through each of two workers of the one or more workers 2. Transaction Based Computing Data 2.1. Data Elements Data can be numerical, textual, symbolic, visual, audio or other information.

Data can also be code, typically in textual form. Whether text is data or code is determined by context. If the code text is being transformed, for example as the result of compilation, then the code would be considered data. If the text code is being programmatically executed on a computer, then the text would be considered code.

It is generally considered bad programming form to invoke code-as-data within code outside of the specific domain of compilers or interpreters, whose job it is to manipulate code. But in general code that creates code is considered overly meta and obfuscating. The admonition against code-as-data is overcome and turned to advantage by constraining the application domain and software into a coherent whole.

All data, without exception, including code and context, belong to one or more ontologies, including the ontologies themselves.

The data at the TBC level of abstraction may be expressed in a specific form called a pearl. Any given piece of code (e.g., input translator 200a of FIG. 1) is free to extract from a pearl the data representations native to the computer language of the code. That is, a pearl can represent a single integer, but in the java language it is also possible to extract a native java int from the pearl and use it like any other procedural code. The difference is that once the code has done its work, all data must be once again expressed in the form of a pearl before passing it along to another translation cell 200. A pearl is the common form of data expression between translation cells.

2.2. Ontology—General

An ontology, as used herein, refers to a finite set of concepts in a domain that shows their properties and the relations between them. Each concept in the ontology has a precise and unique semantic meaning.

A given ontology is specific to the domain or subdomain of an application. There is no intent to describe the universe. This is distinct from efforts such as the semantic web or Google knowledge graph, whose intentions are much more far reaching with concomitant additional complexity.

A novel aspect of TBC is that everything belongs to the ontology: data, code and context. It is common to have a data typing system and a class hierarchy for the code. It is novel that both belong to the same type hierarchy. It is novel for environment, compilation, deployment, testing, hardware, networking and other functions normally ascribed to 'devops' or 'environment' to be included in the same ontology as data and code.

2.3. Ontology—Schema for Pearls

An ontology is a type hierarchy tree for pearl data. Each node in an ontology has a unique name within the ontology. Different ontologies can overlap (i.e., share nodes), be completely disjoint (i.e., no shared nodes) or be subsets of each other (i.e., all nodes of a sub-ontology are common to the super-ontology).

An ontology is defined by a tree of Pearl Schema nodes. Each Pearl Schema node defines the attributes of that particular node in the ontology.

The ontology is regionally common, meaning that any cells which communicate with each other share a common ontology for the exchanged data. This does not imply a single, common global ontology. Although it is hypothetically possible to assemble all of the ontologies into a consistent global whole, it is neither necessary nor generally desirable. It is possible that some group of cells (i.e., a region) may use a different ontology than another region, but if those regions communicate with each other, all data passed between the regions must share a common ontology, which is presumably only a branch of each region's entire ontology.

An example declaration of the products ontology used in the example running application is shown in Appendix A.

2.4. Pearl

A "pearl", as used herein, refers to an instance of encapsulated state for the purposes of storing data or moving data from one module to another. All TBC state adheres to the pearl interface.

Pearls are very similar to JSON and it is helpful to visualize Pearls as JSON. There are some key differences, however:

Pearls are required to adhere to the structure of their ontology. While it is possible to restrict any JSON to a type structure, this requirement is not inherently part of JSON.

Pearl attribute names correspond to Pearl Schema types. That is, any key of a Pearl Tree key/value pair must correspond exactly to the name of a Pearl Schema node in the ontology. Even when JSON is strongly typed, it is typical to of JSON typing systems (e.g., OpenAPI) to allow any type to be associated with any attribute name. See the section on attribute typing below for more details.

Pearls are defined by their functional interface, not textual representation. For example, the three basic forms of pearls described below correspond closely to the Jackson java classes used to represent JSON in Java. While it is possible to translate a Pearl into JSON text for transmission, a Pearl is only fully reconstituted when the JSON is combined with the relevant Ontology and packaged behind a Pearl interface in the native language of choice.

All state throughout the system of this disclosure is encapsulated as a pearl, be it data, code or context. It is novel to this disclosure that a single, consistent representation of state serves all scales, from a single object data inside code (analogous to JSON or an instance of a java class) all the way to large-scale state such a database or data lake.

Another core innovation of the Pearl data representation is that type information is unique to a Pearl's name (within a given ontology).

FIG. 4 shows an abstract visualization of a Pearl. The Pearl structure is similar to and analogous to that of a Romanesco broccoli 110a. Access to a single hypothetical pearl 110b is governed by a common Pearl interface (not shown in figure). Information will be stored in pearls as a set of pearls with root(s) 111. The root(s) 111 point to interior Pearls within Pearls 110c, which themselves have root(s) 111 that point to even deeper Pearls within Pearls within Pearls 100d, and this continues to whatever nested level is necessary to practically describe the entirety of the outermost Pearl 110b.

In addition to the nested Pearls (110b, 110c & 100d), Pearls also support a ranked, ordered progression of Pearls 112 defined as a Pearl Rosette.

There are three basic forms of pearls as shown in FIG. 5.

Pearl Primitive—a container for native data elements, including but not limited to integers, floating point numbers, string text, dates, times, currency, Booleans, arrays and matrices. Within any given language, the primitives will be a form native to that language. When sending a pearl from one system to another, the conversion of primitive data is done in a way that is consistent across native languages. FIG. 5 shows examples primitive integer 120 and primitive string 121.

Pearl Tree—an N-ary tree defined by key/value pairs in which the keys are attribute names (and likewise names of nodes in the ontology) and the values are pearls. FIG. 5 shows example pearl tree 123.

Pearl Rosette—a ranked and ordered set of pearls. FIG. 5 shows example pearl rosette 122.

Pearl representation is designed for a finite number of namable concepts. A graph representation is a superior form of perspective-independent representation, but querying and interacting with a graph is nontrivial. A strict forest-of-trees representation is limited and forces a fixed conceptual organization. Pearls are novel as a middle path between the extremes of trees (simple but limited) and graph (expressive but complex). The strict tree doesn't capture the full representation. The graph fully represents the data but goes on forever.

Pearl representation is novel in that nodes on the ontological graph are both leaf nodes (i.e., have a value) and potential (or actual) interior nodes. Specifically, every Pearl node can simultaneously be a PearlPrimitive, a PearlTree and a PearlRosette. This can be implemented via supporting three different interfaces, via aspect programming or other method. As an example, FIG. 6 shows a phone number Pearl with a variation phoneNumber 500n as an alternative to phone 500c. Phone 500c is a PearlTree object. And although phoneNumber 500n is an integer which could represent the same space of phone numbers, it still contains attributes areaCode and localNumber. That is, myPearl.phoneNumber would be an integer, but myPearl.phoneNumber.areaCode and myPearl.phoneNumber.localNumber still exist. Typically in a data system integers can only exist on leaf nodes of a tree. Continuing with FIG. 6, the phoneHistory 500o is a PearlRosette of phoneNumbers, similar to a list or array. However, phoneHistory 500o can also have attributes like length 500p in the same way as a tree.

An example set of Pearl interfaces used in the example running application is shown in Appendix B 2.5. Pearl Schema Pearl Schema define the type hierarchy of the ontology. Pearl Schema have in principle all of the attributes of Pearls. Practically speaking the implementation of Pearl Schema is a limited subset of Pearls and written directly in the native language of the code and only to the extent necessary for defining the schema.

Pearl Schema are defined by the following attributes:

The name of the ontology that this Pearl Schema belongs to.

The name of the Pearl Schema. This name must be unique among all of the Pearl Schema belonging to the named ontology.

The primitive type of data in pearls belonging to this Pearl Schema. The primitive types include typical language primitive types (e.g., integer number, floating point number, text string, etc.) or one of the types of Pearls.

2.6. Attribute Typing

FIG. 7 compares how the typing of objects and attributes differ from TBC Pearls and typical data structure typing as it might be applied to JSON via a standard such as OpenAPI. Superficially a hypothetical structure for phone numbers might appears as it does for user pearl 500a and user j son 500b, both of which have a name attribute (stored as a String) and cellPhone and homePhone attributes stored as Phone objects. The resulting storage is the same in both cases. Both have defined and used a generic phone object (phone pearl 500c and phone j son 500d).

The difference is that for user pearl 500a the attribute type information is associated with the name pearl 500e, the cellPhone pearl 500h and the homePhone pearl 500i. For the user j son 500b, the type information is associated with the attributes themselves, for example the cellPhone attribute declared to be of object type Phone. For the user pearl 500*a*, the cellPhone attribute does not need to be typed inside the object because it is associated with cellPhone pearl 500*h*.

Note that the JSON structure allows more flexibility. For example, inti phone json 500*k* also has attributes named cellPhone and homePhone, although in this object those attributes are of type number, not phone. This is not possible for inti phone pearl 500*j* where it is not possible to redefine the types of cellPhone and homePhone; their type has already been defined and must remain consistent throughout the ontology.

This forced, ontology-wide attribute type consistency is one of the novel aspects of TBC.

2.7. Channeling

FIG. 8 shows one instance of how a new channel is created by a translation cell to-products 221 which takes input canonical query 102 and produces output products 103. However the channeled nature of pearls makes the details a little more nuanced. The actual input to to-products 221 is a pearl of type translation 136. The highest level attributes of that pearl are "context", "sessionData", "text-Query" and "canonicalQuery", corresponding to channels context 300, session data 131, text query 133 and canonical query 102 respectively. The translation cell 221 only requires canonical query 102 to do its job, but the other data travels along the data flow for free. The output of the translation cell 221 is products 103 data, which is attached to the pearl in the attribute "products" without disturbing other data.

Note that all of the attributes of translation 136 must be explicitly named in the schema. Only those attributes which are part of the schema may be added to a pearl. Pearl's are not free-form tree-of-nodes like JSON.

Note that it is typically considered bad form for un-needed data to be exposed inside a method. Currently TBC relies on structural clarity and programmer discipline to avoid problems, but it would be possible to define pearls in such a way that visibility could be controlled so that this was not possible.

FIG. 9 shows a larger view of how data flows through one full invocation of a product service in virtual channels. Channels are a way of thinking about the data and implemented via Pearls, not a new coding construct. In FIG. 8 the channels are the context 300, web service session data 131, voice query 132, text query 133, canonical query 102, list of products 103, selected and ranked products 134, and response 135. All of this data is contained in a single pearl 110.

When the voice query 132 is converted into text query 133, the voice query 132 is removed from the pearl 110. As processing continues, some data (e.g., context 300) is available through the calculation and beyond. The text query 133 and canonical query 102 are retained and ultimately returned to the front end along with response 135.

Data streaming systems (e.g., Cascading) send columns of data that can be modified, removed or created along the stream. The novelty in this disclosure is the generalizing of a columnar data stream to a general data handling approach. Pearls can be passed from cell to cell via a REST service call, a data stream, gRPC, or Java procedure call. The exact implementation of data transfer is abstracted away while still preserving a stream-like capability.

The channeling example of FIG. 9 is a simplification of the TBC implementation used in the running application. A typical method or service would have a defined input voice query 132 and defined output response 135. Channeling supports the layering in of additional data without disturbing existing data as, the details of which are shown in FIG. 8.

2.6. Mutability and Sealing

At any time it is possible for the code to seal a channel (i.e., a pearl), making it immutable for the rest of its life. This is a novel aspect of TBC. Typically data is declared a-priori as mutable or immutable. Pearls can be mutable for a while and then made immutable, after which updates are not possible.

Any sub-pearl inside a pearl may individually be sealed. As an example of sealing, all schema defined in ontologies are sealed after their creation as shown in Appendix A. Notice the "seal( )" instructions at the end of each schema definition.

3. Details of TBC Code

Code refers to any software program written in any language. Code can be implemented as deep learning, semantic reasoning or traditional procedural form.

As shown in FIG. 10 a translation cell 200 (considered code) may itself contain other translation cells 1 & 2 (200*c* & 200*d*), along with relevant context 300 and relevant ontology 300*b* or other state.

3.1. Translation (Data to Data Design Pattern)

The fundamental pattern is a simple translation of one form of data into another form of data as depicted in FIG. 1 is a selection of high-level examples of TBC implementations to provide a feeling for the diversity and range of the TBC framework.

3.2. Distillation (Data to Multiple Data Design Pattern)

Distillation is the repeated stages of translation of a single stream of data resulting in a progression of different outputs as depicted in FIG. 11. Distillation cell 400 takes data input 1 (100*d*) is translated by translation cell 1 (200*d*) into data 2 (100*e*), which can be exposed externally as shown or not. Continuing, the data is subsequently translated into data 3 (100*f*) and data 4 (100*g*). Distillation provides a compact conceptual language element for defining higher level processing.

3.3. Distillation Example

In FIG. 3 is shown translation cell personalize 204 which prepares the list of products 103 and personalizes the results for return to the front end as part of the example running application. FIG. 12 illustrates in more detail how the personalize 204 cell operates, which includes a distillation cell.

A long list of products 103 goes through a series of distillation phases. First only-available 240 removes any products from the list which current inventory shows to be unavailable, resulting in available products 140. The only-in-budget 241 cell removes products which are too expensive (assuming a constraint exists), resulting in in-budget products 141. In the case of example running application there are multiple styles (i.e., colors) of each product and the default style 242 further refines the data by picking the default style products 142. The products are put in order by rank order 243 giving ordered products 143. Finally top N 244 eliminates all but the top N products 144. This is the end of the distillation cell 204.

Note that while the steps in distillation cell 204 are in and of themselves unremarkable, which is novel in TBC is that this entire processing distillery is available for reuse by a single line of code, as is any TBC. It's not the cells themselves that are novel . . . it is the homogeneity of the framework that allows for near universal reuse that is the novelty. This can be seen most clearly in the recommender design pattern discussed below.

3.4. Deployment (Data to Context Design Pattern)

FIG. 13 demonstrates how code deployment can be included in the TBC framework. In this case a deployment cell 600 produces the entire context 117a (caveat below) used in translation cell 200. The deployment cell 600 contains all of the processing necessary to take Java code 114, compile it into bytecode 115, collect all of the assets into ajar file 116, which is subsequently deployed as the context for translation cell 200.

Note that in the case of deployment cell 600 the hardware 300d is part of the context. Deploying to a developer's local machine is different than deploying into the cloud. However it stands to reason that the literal hardware 300d is not part of what deployment cell 600 produces. Instead it produces the configuration (not pictured) which contains a description of the appropriate type of hardware and ensure that the code is deployed to appropriate hardware.

The novelty of this is that the deployment system is inside the same conceptual and coding framework as the code being deployed.

3.5. Deployment Example

FIG. 14 shows a simplified view of the example running application deployment as it was built, which did not use the TBC framework for deployment. This implementation is typical of current industry standards for automated deployment. Prior to code deployment developer 905 must configure multiple systems to operate in a coherent manner, including but not limited to cloudbuild.yaml 152, build-.gradle 153, Dockerfile 154, deployment.yaml 155 and service.yaml 156. Once configured, developer 905 uses a development environment (e.g., Eclipse 650) to edit java code 114 which GitHub 651 stores in GitHub repository 160. The GCP Cloud Build 652a tool extracts the code, runs a Gradle 653 build process that produces ajar file 116 that the Docker 654 tool packages into a container 161 which the GCP Cloud Build 652b tool submits to the Kubernetes 655 automated deployment system that combines the container 161 with other containers 161b, c, etc. to finally deploy a working service on hardware 904 running the linux 656 operating system.

All of these systems combine to provide a seamless, integrated deployment platform. The problem from the perspective of TBC is that (a) they require manual care in making sure all of the configuration files are consistent (i.e., much data must be repeated in the different files and must be consistent) and (b) the "deployment" can not itself be accessed as a module. Deployment is typically thought of as something around the code which manages the code, but which itself is not reusable as code.

FIG. 15 depicts an equivalent deployment approach using TBC. The deployment approach is the same and it uses all of the same technology, but with differences as follows.

First, existing third party Terraform 658 is used to generate all of the intermediate configuration files from a more concise terraform configuration 163. Terrforms "deployment as code" philosophy is consistent with TBC. What FIG. 15 shows in addition is configuration translator 657 converting the simplest possible configuration, environment name 162, into the terraform configuration. In reality a given project or application at a given company typically has a small number of actual differing deployment requirements. Each deployment may have many parameters, but most likely they can be categorized into a small number of high-level concepts. This is the job of the configuration translator 657.

Finally, the bulk of the deployment process itself is abstracted into a reusable deployment cell 600 which can be more easily reused, and has a standardized pearl input via the GitHub Translator 659.

3.6. Dependency Injection (Data to Code Design Pattern)

FIG. 16 illustrates the novelty of this disclosure for dependency injection (DI). A typical architecture for dependency injection is to provide DI configuration 306 to an injector 213 module which then associates the parent code 201 with the specific implementation of a child worker, for example either worker 1 (211) or worker 2 (212). The DI configuration 306 and injector 213 live outside the worker abstraction.

In contrast, TBC hides both the implementation details of the workers as well as the injection itself inside the worker interface. A translation cell 200 instantiates worker 210 with no knowledge or concern about what is inside the worker. Although DI configuration 306 is the same as above, nothing outside of worker 210 need have any awareness of its presence or content. The injector 213 now pulls configuration DI 306 from the context and instantiates either worker 1 or worker 2.

This only works because of the channeled nature of Pearls. See the section on channeling elsewhere in this disclosure.

3.7. Implementation Selection (Data to Code Design Pattern)

Implementation selection is a generalization of the concept of A/B testing, which provides multiple implementations of a given interface, feature or module that can be selected in real time. Implementation selection is built upon the TBC approach to dependency injection.

3.8. Implementation Selection for A/B Testing

FIG. 17 shoes how TBC implementation selection is used for A/B testing and compares that to a typical A/B testing implementation. Typically an A/B configuration 307 configures a high level A/B router 215. When traffic arrives to service 220 in the form of data 100d, the router 215 will direct the data to either of two (or more) alternative modules worker 1 (211) or worker 2 (212).

Using the same dependency injection approach of FIG. 16, TBC hides the A/B router 215 inside the worker 210. The same A/B configuration 307 is used, but in this case it is deployed from the outer level context 300a to the worker context 300b by deployment cell 600.

3.9. Implementation Selection for Intelligent Cells

Typically it would be the job of a data engineer to design an appropriate data storage architecture. As an example, a highly transactional application might require a relational database using SQL. A social media application might best require the use of a graph DB to manage the network of relationships. An image storage solution might use a key/value store for rapid access of large blobs of data. In each case the structure of the DB is chosen according to the data access pattern.

FIG. 18 shows how TBC implementation selection can be used to create higher level, intelligent cells. Recall that all data in TBC is represented by the pearl interface. Storing data in a pearl abstracts away the actual destination of the data. A SQL DB 251 pearl stores the data in a SQL database (e.g., MySql). A Graph DB 252 pearl stores data in a graph database (e.g., neo4j). A key/value DB 253 pearl stores data in a key/value store (e.g., redis). The pearl interface for all three are the same but their performance varies according to the implementation. This is analogous to java interfaces abstracting implementations but scaled up to the level of databases.

The novelty of TBC shown in FIG. 17 is how Pearl as DB 150 abstracts away all of the storage specific pearls 251, 252 and 253. Inside Pearl as DB 150 intelligent data router 250 selects the best physical implementation for the data at hand. The specific implementation of how intelligent data router 250 operates is not part of this disclosure, but it could be implemented as a trained deep learning classifier to know what is the best form of storage.

3.10. Implementation Selection for Communication

FIG. 19 shows how implementation selection can be used to abstract away a wide range of inter-cell communication.

A communication deployment cell 271 deploys a communication call 272 into every translation cell 200 via the context. Although not shown in other figures, implicitly every translation cell 200 must have some mechanism to receive and transmit information, depicted in the figure as communications cell 272. Three different possible specific variations are shown.

If the sending cell 200a and receiving cell 200b have common context and computer 904, the most efficient communication is by direct method call 910 using a pass through communication cell for method calls 273. If the sending and receiving cells (200a and 200b) do not share common context and computers (904a and 904b), a communication cell for REST service 274 will abstract away the REST service invocation 911 and send the data.

A particularly interesting application is logging, which typically requires an entirely separate data logging system with its own transmission protocols that are outside the main flow of data. In TBC a communication cell for buffered logging 275 uses local disk 913 to buffer data (as logging systems do) and as pictured transmits the data via gRPC 912. If desired, buffered logging comm cell 275 could simply wrap a typical logging system.

Note that all of this is possible because all data is transmitted via pearls so the abstraction interface is already standardized.

3.11. Semantic Linking/Splitting (Code to Code Design Pattern)

Consider the two systems shown in FIG. 20. A monolithic deep Learning system takes query string 101 from user 500a and produces a list of products 103 by way of a deep learning network 256. The deep learning model 170a has been trained with training data via the deep learning trainer 257a. The direct deep learning 256 is a black box and it is not generally possible to look inside and understand any of the intermediate, internal values.

The semantically split system performs the same action of converting query string 101 into products 103. However, TBC breaks apart the problem into the two modules of query translate 202, which convert the query string 101 into intermediate canonical query 102, followed by product query 203, which converts the canonical query 102 into products 103.

Since deep learning is a black box technique, the direct deep learning 256 approach training module can only train based on end-to-end data from query string 101 to products 103. In contrast a semantically split approach can break up the training into decoupled query translate 202 and product query 203.

The intermediate form of canonical query 102 belongs to a finite, well-defined ontology, as required of all pearls. This requirement is essential to ensure the coherence of end result. Without it the training of the query translate 202 module could produce output that was not understood by the subsequent product query 203 module and break coherence.

Note that semantically split deep learning acts not unlike a deep learning autoencoder. The difference is that the interior nodes are explicit and pre-defined as the ontology for canonical query 102.

The separation of the overall translation into intermediate translations allows for specialized, focused training. For example, expert 906 with domain knowledge can help evaluate and train product query 203 focusing only on the best products 103 with no ambiguity in the canonical query 102. The direct deep learning system 256 must combine training for both into one. The advantage of the single direct deep learning is that it is not necessary for the system designer to anticipate or worry about the intermediate representation of a canonical query.

In addition an inverse translator 258 could reverse translate the canonical query 102 to give feedback to the user as to the system's understanding of the original query, which is exactly how the example running application embodiment operates. This gives feedback to the user so that they can adjust their query as needed.

3.12. Semantic Linking Example

FIG. 21 repeats a portion of FIG. 20 and overlays an image of the example running application front end 902. It demonstrates an example user query 101 of "running shoes for heavy runners". The primary results is a list of products 103. The reverse translator 258 not only returns the obvious term "heavy runner", but also it translates "heavy runner" into the shoe related feature of "extra cushion". These are presented to the user as readable query 171.

3.13. Bayesian Semantics

All pearls in TBC potentially have Bayesian probabilities associated with them. In the running application this was implemented in ranking where probabilistic estimates of the desirability of different products were combined according to Bayesian reasoning.

The nature of pearls allows probabilities to be added after the fact without disturbing the flow of data or cell interfaces. In addition, all posterior probabilities retain their entire history of prior and conditional probabilities for debugging and post hoc improvement of the probabilities.

3.14. Traceability

An ideal implementation of TBC would retain all data ever created until such time as it was appropriate to archive or delete it. This is difficult to visualize in traditional code-dominant architectures. But instead start with the image of an excel spreadsheet, which is a data-first architecture in which code simply transforms one set of cells into a different set of cells. Code is the bridge between nodes where are data. Then imagine each spreadsheet stacked up along a time axis retaining the value of each cell as a function of time. The TBC supports this architecture for a general system. It has not yet been implemented in the running application.

3.15. Recommender (Code Reuse Design Pattern)

In FIG. 22 can be seen a simplified view of how the example running application recommendations are generated. What is novel about the implementation is that there is no separate recommendation engine. Instead the exact same search query engine is used, but with alternate queries that are derived from the canonical query.

User 901 submits query string 101 via front end 902. The query string 101 is translated into a canonical query 102 by the query translate cell 202. The product query 203 cell returns a list of products 103 that are subsequently formatted by the personalize 204 cell to produce a product response 104 that returns to the front end. This has all been described before in this disclosure.

To create recommendations for alternative products for the user, the canonical query 102 is input to an alternate query builder 270 which modifies the canonical query 102 into an alternate query 172.

For example, imagine an original query that specified a brand, price, and pronation constraint. The alternate query builder might construct one query with the same price and pronation constraint, but a different brand. It might construct a query with the same brand and pronation constraint but relax the price constraint. Thus, instead of using collaborative filtering or other specialized recommenders, the system makes use of the existing search query engine with alternate input.

The alternate query 172 is passed through the same product query 203 and personalize 204 modules to produce recommended products 173 and recommendation response 174 respectively.

The technical novelty supporting this approach is that the TBC framework supports easy reuse of entire subsystems from any place in the system. This is made possible by the standardized pearl based input/output architecture.

4. Details of TBC Context

The linear execution path of code in translation cell 200 is defined by input and output translators 200a and 200b as depicted in FIG. 2 is a selection of high-level examples of TBC implementations to provide a feeling for the diversity and range of the TBC framework.

The context 300 is the collection of resources, both code and data, that are globally available to the execution of the translators.

Although FIG. 2 shows context 300 as containing four modules (state data 300a, ontology 300b, libraries 300c and hardware 300d), this is an abstract view. For any given embodiment a context 300 is defined as those resources that are made globally accessible to the input and output translators 200a and 200b. For example, it would be typical for hardware 300d to be abstracted away and not directly accessible to code. In this case hardware 300d would not be considered part of the context for this particular translation cell 200. However, a particular embodiment of a translation cell 200 which deployed software onto a specific machine would indeed need to be aware of the exact version of hardware 300d, and in that case the hardware would be considered part of the context. This extends to all of the elements of a context 300.

Typical software explicitly defines code and data, but leaves context defined outside the programming framework as environment. It is generally considered bad programming form to have context aware code, the premise being that context agnostic code is easier to debug, easier to test and less prone to subtle errors. The admonition against context awareness is overcome and turned to advantage by constraining the application domain and software into a coherent whole.

Languages differ in the amount that context influences the meaning of a statement. English would be an example of highly contextual as statements can be ambiguous out of context. Computer languages are typically not highly contextualized. Languages with low contextual dependency are less ambiguous but tend to have more parameters and complexity. The goal of highly contextualized computer language is to achieve semantic simplicity at a cost of precision.

4.1. Sharding

The finite, well-defined ontological domain of TBC allows for early contextual division.

In FIG. 23 is shown a typical architecture for distributing loads. In order to avoid overly tight coupling between systems, the services system and the data system are divided separately. It provides for a clean separation, but requires that each system provide sharding/load-balancing capability and each system must maintain the full set of capabilities and data. A load balancer 280 distributes the load between system 1 (281) and system 2 (282). Each of those systems uses database 180, which itself re-shards the load between DB shard 1 (181) and DB shard 2 (182).

The lower part of FIG. 23 illustrates the TBC architecture of using classifier 283 in order to choose between system 1 (281) and system 2 (282) to handle the entire request, each accessing it's own data in DB 1 (181) or DB 2 (182).

4.2. Sharding Example

The example running application uses this approach to have a single query input be applicable for product searches, question & answers, and commands. The query input is analyzed by a classifier and subsequently passed to the appropriate sub-system.

4.3. Configuration

Typically managing and deploying of configuration is handled by libraries outside the main flow of the application (e.g., Spring Framework). In TBC configuration is just another flow of data using the same interfaces and architecture as the rest of the system. The same mechanism that deploys code (see FIG. 13) can also deploy and update configuration, which as with all data is expressed as a pearl.

The meta-problem of how to configure the deployment cells, that themselves need configuration but that are the means of deploying configuration, is resolved by the bootstrap process described below.

4.4. Bootstrap

Analogous to how the Linux operating system has a native, machine specific kernel to allow the operating system to get started before there is an operating system, TBC requires bootstrap code written in the native language (e.g., Java for the example running application) to allow TBC to start running. The TBC bootstrap for the example running application provides the services listed below. This list is just an example and will change as TBC evolves. The bootstrap code is not written in the architecture or language of TBC because at the time it is running TBC is not yet running. The goal is to keep the scope of the bootstrap to the absolute minimum required for bootstrapping TBC.

There are two basic steps to bootstrap. The first step is to provide bootstrap resources, which is the basic configuration information necessary to start a TBC application. The second step is to construct the outermost context which is given the specialized name EcoSystem. The EcoSystem provides and abstracts essential OS level services in the form of a TBC context.

As depicted in FIG. 24 bootstrap 700 uses primitive configuration files 702 to construct EcoSystem 701, the outermost, universal context for the (as an implemented example) example running application Back End 284.

Bootstrap resources
    Primitive configuration based on property files (702)
        Identify the environment name
        File system root
        Database access URLs and credentials
Build EcoSystem (701)
    Ontologies (712)—service to provide access to all relevant ontologies
    DB access services (708)
    File access services (709)
    Persistence services (711)
    Publish/Subscribe services (710)

4.5. Databases

As described above TBC abstracts away database details by encapsulating them in pearls. However, at some point any TBC application must be able to translate that into actual database connections. The EcoSystem encapsulates and abstracts database access via database services 708. To the rest of the system a database appears as a big pearl.

For the example running application back end 284 three databases are made available: accounts DB 703 holding orders and returns, products DB 704 holding product catalog and inventory, and analytics DB 705 holding logs and usage statistics.

4.6. File System

Still referring to FIG. 24, EcoSystem 701 abstracts files via file services 709 that abstract files as pearls. The example running application back end 284 two file systems are used: local filesystem 706 and Google Cloud files 707. To the rest of the system a files appear as a read-only pearl.

4.7. Persistence

EcoSystem 701 provides persistence services 711 to mange the encapsulation of all persistent data. Recall that TBC applications function analogously to functional programming (i.e., no state) with respect to the flow of pearls, but the context indeed holds state. The difference between how TBC manages state and general object oriented programming (in which every class potentially holds state, and there are no rules about which classes hold state and which ones don't).

FIG. 25 provides a detailed look at the handling of persistence for one example (i.e., product catalog) in the example running application. Product deployment 680 deploys the product catalog CSV file 311 to the products table 713 of the product DB 704. This same product DB 704 is available to the example running application back end 290 via the product context 301. Although not shown in the figure, this is made possible by a higher level context.

To deploy the product catalog, product catalog file 311 is made available by file services 709 in form of a CSV text pearl 681. That is, the data is in pearl form, but the semantic structure is just rows of text data with no further semantic interpretation. The CSV-to-Pearl translation cell 682, which is generic to any CSV data, converts the data into a product catalog pearl 683 according to the CSV ontology 315. At this point the data is structured as a rosette of pearls with one pearl per row of the original CSV, and each row pearl has one node per column. The semantic meaning of the CSV columns is encoded in the CSV ontology 315. The ontology translator 684 translates the product catalog pearl 683 (CSV ontology) into product catalog pearl 685 (system ontology) according to system ontology 316. At this point the product catalog is fully converted into the example running application internal format.

The catalog deployment cell 686 sends the product catalog pearl 685 to DB services 708. Note that pearl data is self describing and the system need only send the pearl to the database service and it will know how and where to store the data. Every node in the pearl schema has a unique attribute path as described above in the section on pearls, and that attribute path will determine where the data gets stored. This is similar to the way in which third party EdgeDb stores data, albeit with a different interface.

In order to store the data the pearl is first converted into a specialized, pre-SQL form called pearl breakdown 312. Subsequently the pearl-to-SQL cell 313 generates the SQL command to store the data in the product DB 704.

This process occurs any time there is an update to the product catalog. In the current example running application the entire product catalog is always updated, but incremental updates are possible.

When example running application back end 290 launches, persistence services 711 will extract the product catalog from the same product catalog DB 704 and make it available to the back end as a persistent product catalog pearl 687. When a canonical query 102 is used by product query 203 to search for products, the product catalog pearl 687 is used to fully populate the list of products 103.

In the current example running application rolling restarts are used to force load of an updated catalog, but live updates are possible.

4.8. Logging

As mentioned in the section Implementation Selection for Communication above, logging is accomplished using the standard pearl communication.

Appendix A: Example Ontology Definition from Pluot Running

Below is the Java code used to define the ontology of products for the example running application implementation of the TBC framework. This is only one of many ontologies used in the system. Ontologies are not language specific and can be implemented in any native software language.

This declaration defines the schema of all data in the Product ontology.

```
public class OProduct extends Ontology {
public PearlTree PRODUCTS=define("products")
  .withDescription("An array of products.")
  .asRosetteOf("product")
  .seal( );
public PearlTree PRODUCT=define("product")
  .withDescription("Full information about one product.
    This data is held in server memory.")
  .withProp("productId", Token.PRIMARY_KEY)
  .withProp("brandProductId")
  .withProp("styles")
  .withProp("brand")
  .withProp("description")
  .withProp("gender")
  .withProp("productName")
  .withProp("brandedProductName")
  .withProp("productCategory")
  .withProp("productSubCategory")
  .withProp("prettySubCategory")
  .withProp("genderedSubCategory")
  .withProp("productFamily")
  .withProp("productModel")
  .withProp("modelVersionSequence")
  .withProp("source")
  .withProp("defaultImageUrl")
  .withProp("defaultStyleId")
  .withProp("displayPrice")
  .seal( );
public PearlTree STYLE=define("style")
  .withDescription("Full information about one style. Heald
    in server memory.")
  .withProp("productStyleId", Token.PRIMARY_KEY)
  .withProp("productId", Token.INDEX)
  .withProp("brandUrl")
  .withProp("brandStyleId")
  .withProp("colors")
  .withProp("defaultImageUrl")
  .withProp("images")
  .withProp("brandImages")
```

```
    .withProp("isNew")
    .withProp("isOnSale")
    .withProp("styleType")
    .withProp("blacklist")
    .withProp("isStyleAvailable")
    .withProp("price")
    .withProp("styleInventory")
    .seal( );
public PearlTree PRODUCT_STYLE=define("product-
Style")
    .withDescription("Complete information about one prod-
        uct style. Union of product, style and review info.")
    .inherit("product")
    .inherit("style")
    .seal( );
public PearlTree BRAND_PRODUCT_ID=define("brand-
ProductId")
    .withDescription("Brand's product. NOT the pluot prod-
        uct it. Only used for updating data from feed, and
        maybe not even then.")
    .asPrimitive(DatumType.STRING)
    .seal( );
public PearlTree BRAND=define("brand")
    .withDescription("Product brand. Note that there is also
        'brands', which is a filter.")
    .asPrimitive(DatumType.STRING)
    //Must keep this consistent with brands until we can
        inherit enumerations.
    .withEnumeration("Nike",
        "Brooks",
        "adidas",
        "Asics",
        "New Balance",
        "Saucony"
        )
    .seal( );
public PearlTree COLORS=define("colors")
    .withDescription("Colors of a style.")
    .asRosetteOf(DatumType.STRING)
    .seal( );
public PearlTree PRODUCT_NAME=define("product-
Name")
    .withDescription("Product name, without the brand. This
        tends to be the model (e.g., 'Air Zoom Pegasus' fol-
        lowed by"
        +"a model version number (e.g., 'Air Zoom Pegasus
            36'")
    .asPrimitive(DatumType.STRING)
    .seal( );
public PearlTree BRANDED_PRODUCT_NAME=define
("brandedProductName")
    .withDescription("Product name, including the brand.")
    .asPrimitive(DatumType.STRING)
    .seal( );
public PearlTree PRODUCT_CATEGORY=define("pro-
ductCategory")
    .withDescription("Product category. The value for now is
        always 'Footwear'.")
    .asPrimitive(DatumType.STRING)
    .seal( );
public PearlTree PRODUCT_SUB_CATEGORY=define
("productSubCategory")
    .withDescription("Product sub-category. The value for
        now is always 'running-shoes'.")
    .asPrimitive(DatumType.STRING)
    .seal( );
public PearlTree PRETTY_SUB_CATEGORY=define
("prettySubCategory")
    .withDescription("Pretty product sub-category. The value
        for now is always 'Running Shoes'.")
    .asPrimitive(DatumType.STRING)
    .seal( );
public PearlTree GENDERED_SUB_CATEGORY=define
("genderedSubCategory")
    .withDescription("Pretty product sub-category, including
        gender.")
    .asPrimitive(DatumType.STRING)
    .seal( );
public PearlTree PRODUCT_FAMILY=define("pro-
ductFamily")
    .withDescription("Product family. The value for now is
        always 'shoes'.")
    .asPrimitive(DatumType.STRING)
    .seal( );
public PearlTree PRODUCT_MODEL=define("product-
Model")
    .withDescription("The product model. Within a given
        brand, product model is a grouping of sequenced"
        +"releases of a model line. The sequencing is described
            by modelVersionSequence.")
    .asPrimitive(DatumType.STRING)
    .seal( );
public PearlTree PRODUCT_VERSION_SEQUENCE=
define("modelVersionSequence")
    .withDescription("The order in which different versions
        of the same model are released. First version is #1 and
        it goes up from there.")
    .asPrimitive(DatumType.INTEGER)
    .seal( );
public PearlTree URL=define("url")
    .withDescription("Generic url.")
    .asPrimitive(DatumType.STRING)
    .seal( );
public PearlTree BRAND_URL=define("brandUrl")
    .withDescription("Url to the brand web site.")
    asPrimitive(DatumType.STRING)
    .seal( );
public PearlTree DEFAULT_IMAGE_URL=define("de-
faultImageUrl")
    .withDescription("Url to the default image for a style.")
    asPrimitive(DatumType.STRING)
    .seal( );
public PearlTree IMAGE=define("image")
    .withDescription("One image, including different sizes.")
    .withProp("url")
    .withProp("thumbUrl")
    .seal( );
public PearlTree IMAGES=define("images")
    .withDescription("An array of images.")
    .asRosetteOf("image")
    .seal( );
public PearlTree BRAND_IMAGE=define("brandImage")
    .withDescription("One image, including different sizes.")
    .inherit("image")
    .seal( );
public PearlTree BRAND_IMAGES=define("brandIm-
ages")
    .withDescription("The images with url's pointing to the
        original, images from the brands.")
    .asRosetteOf("brandImage")
    .seal( );
```

```
public PearlTree THUMB=define("thumbUrl")
    .withDescription("Thumb nail sized image.")
    .asPrimitive(DatumType.STRING)
    .seal( );
public PearlTree DEFAULT_IMAGE=define("defaultImage")
    .withDescription("The default image to show for a product or style.")
    .inherit("image")
    .seal( );
public PearlTree SOURCE=define("source")
    .withDescription("The source for ordering a product.")
    .withProp("url")
    .seal( );
public PearlTree GENDER=define("gender")
    .withDescription("Gender of a person. Note this is different than the filter, which is in genders.")
    .asPrimitive(DatumType.STRING)
    //Must keep this consistent with genders until we can inherit enumerations.
    .withEnumeration("Men's", "Women's")
    .seal( );
public PearlTree PRODUCT_ID=define("productId")
    .withDescription("Official, unique identifier for pluot products.")
    .asPrimitive(DatumType.STRING)
    .seal( );
public PearlTree BLACKLIST=define("blacklist")
    .withDescription("Blacklist . . . don't show or sell these products.")
    .asPrimitive(DatumType.BOOLEAN)
    .seal( );
public PearlTree IS_STYLE_AVAILABLE=define("isStyleAvailable")
    .withDescription("True if this style is available.")
    .asPrimitive(DatumType.BOOLEAN)
    .seal( );
public PearlTree DISPLAY_PRICE=define("displayPrice")
    .withDescription("The product level price to display on front end. Currency is represented as BIGINT pennies× 1000.")
    .asPrimitive(DatumType.CURRENCY)
    .seal( );
public PearlTree FEATURES_NEG=define("featuresNeg")
    .withDescription("Not sure if we are using this.")
    .asPrimitive(DatumType.STRING)
    .seal( );
//////////////////////////////////////////////////////////////
//PRICE
public PearlTree PRICE=define("price")
    .withDescription("The different variations of price for a style.")
    .withProp("msrp")
    .withProp("discountedPrice", Token.INDEX)
    .withProp("discount")
    .withProp("currency")
    .seal( );
    //TODO: Come up with a currency type
    //TODO: Get integer types to work in db, quoting is messed up public PearlTree MSRP=define("msrp")
    .withDescription("Manufacturers suggested retail price. Currency is represented as BIGINT pennies×1000.")
    .asPrimitive(DatumType.CURRENCY)
    .seal( );
public PearlTree DISCOUNTED_PRICE=define("discountedPrice")
    .withDescription("The lowest available price for a product style. Currency is represented as BIGINT pennies× 1000.")
    .asPrimitive(DatumType.CURRENCY)
    .seal( );
public PearlTree DISCOUNT=define("discount")
    .withDescription("The discount percentage from MSRP to discounted price.")
    .asPrimitive(DatumType.STRING)
    .seal( );
public PearlTree CURRENCY=define("currency")
    .withDescription("The currency of the price (e.g., USD).")
    .asPrimitive(DatumType.STRING)
    .seal( );
//////////////////////////////////////////////////////////////
//STYLES
public PearlTree STYLES=define("styles")
    .withDescription("An array of product styles.")
    .asRosetteOf("style")
    .seal( );
public PearlTree PRODUCT_STYLE_ID=define("productStyleId")
    .withDescription("The unique id for any product style.")
    .asPrimitive(DatumType.STRING)
    .seal( );
public PearlTree BRAND_STYLE_ID=define("brandStyleId")
    .withDescription("The brand's id for a style.")
    .asPrimitive(DatumType.STRING)
    .seal( );
public PearlTree IS_NEW=define("isNew")
    .withDescription("1 if the product is new, 0 otherwise.")
    .asPrimitive(DatumType.BOOLEAN)
    .seal( );
public PearlTree IS_ON_SALE=define("isOnSale")
    .withDescription("1 if the product is on sale, 0 otherwise.")
    .asPrimitive(DatumType.BOOLEAN)
    .seal( );
public PearlTree STYLE_TYPE=define("styleType")
    .withDescription("The type of style, e.g., muted.")
    .asPrimitive(DatumType.STRING)
    .withEnumeration("Muted",
        "Bright"
        )
    .seal( );
public PearlTree PRODUCT_STYLE_IDS=define("productStyleIds")
    .withDescription("An array of style ides.")
    .asRosetteOf("productStyleId")
    .seal( );
//////////////////////////////////////////////////////////////
//DESCRIPTION
public PearlTree DESCRIPTION=define("description")
    .withDescription("The description of a product. Not well named as this is NOT a generic description, but rather attributes of a product.")
    .withProps("overview")
    .withProps("supports")
    .withProps("cushions")
    .withProps("otherFeatures")
    .withProps("surfaces")
    .withProps("uses")
    .withProps("measurement")
    .withProps("fit")
    .seal( );
```

```
public PearlTree FILTERED_DESCRIPTION=define("fil-
teredDescription")
    .withDescription("The description from which only attri-
        butes are shown which are relevant to the current
        product filter.")
    .inherit("description")
    .seal( );
public PearlTree OVERVIEW=define("overview")
    .withDescription("Textual overview of a product. May
        not be using this.")
    .asPrimitive(DatumType.TEXT)
    .seal( );
public PearlTree SUPPORTS=define("supports")
    .withDescription("The supports of a product. This filter
        merges data gathered from archType and bodyCondi-
        tions"
        +"gathered on the login flow.")
    .asRosetteOf(DatumType.STRING)
    .withEnumeration("Neutral",
        "Pronation",
        "Supination",
        "Plantar Fasciitis",
        "Flat Feet",
        "High Arches",
        "Achilles Tendonitis",
        "Runner's Knee"
        )
    .seal( );
public PearlTree CUSHIONS=define("cushions")
    .withDescription("Attributes of the shoe cushion.")
    .asRosetteOf(DatumType.STRING)
    .withEnumeration("Zero Drop",
        "Low Drop",
        "High Drop",
        "Medium Drop"
        )
    .seal( );
public PearlTree OTHER_FEATURES=define("otherFea-
tures")
    .withDescription("An array of other feature.")
    .asRosetteOf("otherFeature")
    .seal( );
public PearlTree OTHER_FEATURE=define("otherFea-
ture")
    .withDescription("The otherFeature value for a product.
        This is a filter in that the translate layer"
        +"will show the filter and the user can un-select it, but
            it does not appear on the modify filters screen.")
    .asPrimitive(DatumType.STRING)
    .seal( );
public PearlTree SURFACES=define("surfaces")
    .withDescription("Surface attributes of product, and the
        filter for it.")
    .asRosetteOf(DatumType.STRING)
    .withEnumeration("Road",
        "Trail",
        "Track",
        "Cross-county"
        )
    .seal( );
public PearlTree USES=define("uses")
    .withDescription("The activities that a shoe is appropriate
        for.")
    .asRosetteOf(DatumType.STRING)
    .withEnumeration("Long Distance",
        "Cross Training",
        "Racing",
        "Beginner",
        "Daily Training",
        "Everyday Wear"
        )
    .seal( );
public PearlTree MEASUREMENT=define("measure-
ment")
    .withDescription("One measurement attribute of a prod-
        uct. This is a filterable value, but not appearing in
        Modify Filters.")
    .asPrimitive(DatumType.STRING)
    .seal( );
public PearlTree FIT=define("fit")
    .withDescription("One fit attribute of a product.")
    .asPrimitive(DatumType.STRING)
    .seal( );
}
```

Appendix B: Example Pearl Interface Definitions from Pluot Running

These are the current interfaces for different versions of Pearls. Pearls can be implemented with variations of these interfaces.

Pearl
- String getSchemaPath( )—return the 'name' of this pearl, which is also the name of it's schema.
- PearlPrimitive asP( )—cast this pearl to a PearlPrimitive.
- PearlRosette asR( )—cast this pearl to a PearlRosette.
- PearlTree asT( )—cast this pearl to a PearlTree.
- JsonString asJson( )—cast this pearl to a string of JSON text.
- PearlTree getSchema( )—get the schema of this pearl.
- Pearl seal( )—Make this pearl immutable.
- Pearl deepCopy( )—make a copy of the pearl and make a deep copy of its attributes.
- Pearl shallowCopy( )—duplicate the pearl but retain the original attribute values.
- boolean isImmutable( )—return true if this pearl has been sealed.
- boolean isNumber( )—return true if this pearl represents a number.

PearlTree
All the attributes of Pearl, plus the following . . .
- Pearl getPearl(String branchPath)—return the pearl located at the node specified by branchPath, which is of the form "path1.path2.path3".
- public PearlTree getPearl(PearlTree schema)—return a pearl constructed according to the argument schema. This is a generalized version of the previous method.
- public void setPearl(String branchPath, Pearl pearl)—replace the pearl at the specified path with the argument pearl.
- public Set<String> getAttributePaths( )—get the first level attribute names of the pearl.
- public Set<String> getRoots( )—get the roots of the pearl. Note that there is a difference between the root and the attribute path. A pearl might have an attribute path of "user.name" without having the attribute "user". That is, the "user" attribute of the pearl would be empty whereas "user.name" would have the user's name. In this example, the attribute "user" would be the root, but "user.name" is the attribute path.
- public boolean isBranch(String branchPath)—Returns true if this is a valid root branch name within the EcoSystem. The branchPath may be dotted, in which case each token must individually be a valid branch name. The branch may exist but have no value.

public boolean isEmpty(String branchPath)—True if there is NO branch. True if the value is an empty string, empty rosette or PearlEmpty. False otherwise. See also isBranch which returns true if branch exists but empty of content.

//Convenience methods to get at primitives inside the tree.

public int getInt(String branchPath)
public String getString(String branchPath);
public String getJson(String branchPath);
public double getDouble(String branchPath);
public float getFloat(String branchPath);
public boolean getBoolean(String branchPath);
public void set(String branchPath, Object arg)—set the value of the node at the branchPath to be the argument. The system will automatically detect the arg type and create the appropriate kind of pearl.
public void delete(String branchPath)—remove the node at the given path.
public PearlTree flatten( )—flatten a tree into dotted paths.

//Set operations on the entire pearl tree.

public PearlTree union(PearlTree pearl);
public PearlTree intersect(PearlTree pearl);
public PearlTree diff(PearlTree pearl);
public PearlTree xor(PearlTree pearl);

PearlPrimitive

All the attributes of Pearl, plus the following . . .

public int getInt( );
public long getLong( );
public String getString( );
public String getJson( );
public double getDouble( );
public float getFloat( );
public boolean getBoolean( );

PearlRosette

All the attributes of Pearl and Iterable<Pearl>, plus the following . . .

public List<Pearl> asList( )—convert the rosette into a list of pearls.
List<PearlTree> asListOfT( )—convert the rosette into a list of pearl trees.
PearlTree getItemSchema( )—get the schema of the items in the pearl. All items must share a common schema.
boolean add(Pearl pearl)—Add this pearl to the rosette. It must have compatible schema. The rosette must still be mutable.
int size( )—return the number of pearls in the rosette.

Appendix C: Drawing Reference Numbers

This disclosure has a large number of figures with an expansive set of reference numbers. Those reference numbers have been collected here for clarity. Numbers are consistent across all figures.

Reference numbers are grouped in blocks of 100 as follows:

100 block—data
200 block—code/translation cells
300 block—context
400 block—distillation cells
500 block—pearls in attribute view
600 block—deployment cells & related
700 block—bootstrap
800 block—reserved
900 block—eternal to TBC

| Reference Number | Reference Text | Comment |
|---|---|---|
| 100 | Data | Generic pearl data |
| 100a | input data | Generic pearl data as input to translation cell |
| 100b | canonical data | Technically all pearl data is in "canonical form" in that it adheres to an ontology. Canonical data is pearl data in it's most reduced and specific form. |
| 100c | output data | Generic pearl data as translation cell output |
| 100d | data 1 | Generic pearl data |
| 100e | data 2 | Generic pearl data |
| 100f | data 3 | Generic pearl data |
| 100g | data 4 | Generic pearl data |
| 101 | query string | Human entered string as query to the example running application system. |
| 102 | canonical query | Translation of the query string into canonical form. |
| 103 | products | Pearl Rosette of product information, including product details. |
| 104 | product response | Product data that has been formatted for transmission to the front end, including other non-product data. |
| 110 | Pearl | Generic pearl |
| 110a | Romanesco broccoli | Visual analog to the structure of pearl data. |
| 110b | Pearl | Generic pearl |
| 110c | Pearl-in-a-Pearl | Generic pearl within a pearl |
| 110d | Pearl-in-a-Pearl-in-a-Pearl | Generic pearl within a pearl within a pearl |
| 111 | Pearl roots | A pearl is a forest of trees. Each tree has one root. These are all the roots inside a pearl. |
| 112 | Ranked, ordered set of Pearls | A pearl rosette. |
| 114 | Java code | Generic java code |
| 115 | bytecode | Generic java bytecode |
| 116 | jar file | Generic jar file |
| 117a | context as data | Context, but represented as data as opposed to a context currently running in an application. |
| 117b | context as data | Context, but represented as data as opposed to a context currently running in an application. |
| 120 | Primitive Pearl Integer | A pearl which contains a single integer |
| 121 | Primitive Pearl String | A pearl which contains a single string |
| 122 | Pearl Rosette | A pearl which holds a ranked, ordered set of pearls |
| 123 | Pearl Tree | A tree structure of pearls |
| 131 | Session data | Data identifying a web session |
| 132 | voice query | Human voice data for to query the system |
| 133 | text query | Conversion of voice data to text |
| 134 | selected and ranked products | A list of products that have been filtered, selected and ranked. |
| 135 | response | The final back end response to be sent to the front end |
| 136 | translation | translation |
| 140 | available products | The product catalog has products which might not be currently available. These are the available products. |
| 141 | in-budget products | Products whose price is less than or equal to a price constraint |
| 142 | default style products | Each product has multiple styles (i.e., colors). The default style is the one to display in the absence of other information. |
| 143 | ordered products | An ordered list of products. |
| 144 | top N products | The first N products of the ordered products. |
| 145 | slugs | URLs that have encoded in them a specific query or product. |
| 146 | VOP | The Voice of the system, text presented to the user in the example unning application which provides explanation, elaboration or more details about the returned products. |
| 150 | Pearl as DB | A pearl which represents an entire database. |
| 152 | cloudbuild.yaml | Configuration file for Google cloud build. |
| 153 | build.gradle | Configuration file for Gradle |
| 154 | Dockerfile | Configuration file for Docker |
| 155 | deployment.yaml | Configuration file for Kubernetes |
| 156 | service.yaml | Configuration file for Kubernetes |
| 160 | GitHub Repo | Third party code storage service. |

| Reference Number | Reference Text | Comment |
|---|---|---|
| 161 | container | An encapsulation of code and data in the Docker system. |
| 162 | Environment name | The name of the environment (e.g., production, development) |
| 163 | Terraform Configuration | Configuration file for Terraform |
| 170 | Deep learning model | The weights used by a deep learning inference engine. |
| 171 | Readable query | A reflection back to the user of how the example running application understood the user's query. |
| 172 | Alternate queries | Variations of the canonical form of a user query |
| 173 | Recommended products | Product recommendations in the example running application system. |
| 173 | Recommendation response | Final format of the recommended products to be sent to the front end, along with other information. |
| 180 | DB | A database |
| 181 | DB Shard 1/ DB 1 | A database, possibly one shard of a larger DB |
| 182 | DB Shard 2/ DB 2 | A database, possibly one shard of a larger DB |
| 200 | Translation Cell | Generic translation cell |
| 200a | Input Translator | Generic cell that translates from the input |
| 200b | Output Translator | Generic cell that translates to the output |
| 200d | translation cell 1 | Generic translation cell |
| 200e | translation cell 2 | Generic translation cell |
| 200f | translation cell 3 | Generic translation cell |
| 201 | Code | Generic software code |
| 202 | query translate | The translation cell in the example running application which translates the user query into canonical form. |
| 203 | product query | The translation cell in the example running application which performs the product search based on the query. |
| 204 | personalize | The translation cell in the example running application which packages up the result for sending to the front end. |
| 210 | Worker | Generic software module |
| 211 | Worker 1 | Generic software module |
| 212 | Worker 2 | Generic software module |
| 213 | Injector | Code to perform dependency injection. |
| 215 | A/B Router | Code to route traffic to alternate workers |
| 220 | Service | Generic REST service |
| 221 | to products | Translation cell that converts input to a list of products. |
| 240 | only available | Translation cell that filters out unavailable products |
| 241 | only in budget | Translation cell that filters out products above price constraint. |
| 242 | default style | Translation cell that picks a default style |
| 243 | rank order | Translation cell that rank orders products |
| 244 | top N | Translation cell that filters out all but the first N products |
| 245 | add slugs | Translation cell that adds slugs to the response pearl |
| 246 | add voice of system | Translation cell that adds voice of system to the response pearl |
| 247 | add tooltips | Translation cell that adds tooltips to the response pearl |
| 250 | Intelligent data router | Translation cell which abstracts different storage media into a unified DB pearl |
| 251 | SQL DB Cell | Translation cell that can translate pearl to SQL DB comands |
| 252 | Graph DB Cell | Translation cell that can translate pearl to graph DB commands |
| 253 | Key/Value DB Cell | Translation cell that can translate pearl to key/value DB commands |
| 256 | Direct deep learning module | A deep learning neural network inference engine |
| 257 | Deep learning trainer | Code which trains a deep learning model |
| 258 | Inverse translator | A translation cell which translates from canonical query back to human readable form. |
| 259 | Testing tool | A generic tool to test the deep learning network. |
| 270 | Alternate query builder | A translation cell which creates alternate versions of a canonical query for the purpose of generating recommendations. |
| 271 | Communication Deploy Cell | A translation cell which generates a specific implementation of a communication cell |
| 272 | Commination Cell | A translation cell which abstracts away different forms of inter-cell communication (e.g., method call, REST, gRPC) |
| 273 | Comm Cell - Method Call | A communication cell which is a method call pass-through |
| 274 | Comm Cell - REST Service | A communication cell which use REST services |
| 275 | Comm Cell - Buffered Logging | A communication cell which use buffered communication services like that which would be used for logging |
| 280 | Load Balancer | Traditional load balancer |
| 281 | System 1 | Generic software system |
| 282 | System 2 | Generic software system |
| 283 | Classifier | A translation cell |
| 290 | example running application back end | A reduction to practice of the TBC framework for the example running application. |
| 300 | Context | Generic context |
| 300a | State Data | Generic state data stored in a context |
| 300b | Ontology | Generic ontology stored in a context |
| 300c | Libraries | Generic code libraries available in a context |
| 300d | Hardware | Generic computer hardware |
| 301 | product context | Context for example running application |
| 302 | product persistence | Persistence service for product data in example running application |
| 303 | product ontology | Ontology for products in example running application |
| 304 | product libraries | Code libraries for example running application |
| 305 | configuration | Generic configuration in context |
| 306 | DI configuration | Configuration of dependency injection |
| 307 | A/B Configuration | Configuration for A/B router |
| 311 | Product Catalog Feed CSV File | CSV file with product catalog data |
| 312 | Pearl Breakdown | Intermediate representation between pearl and SQL commands |
| 313 | Pearl-to-SQL | Translation cell to convert pearl to SQL commands |
| 314 | Product Deployment Context | Context for product catalog deployment translation cell |
| 315 | CSV Ontology | Ontology for the CSV data file |
| 316 | System Ontology | Ontology for internal use in example running application back end |
| 400 | Distillation Cell | Generic distillation cell |
| 400a | Product Query | Simplified view of a product query application of TBC |
| 400b | Pool Controller | Simplified view of a pool controller application of TBC |
| 400c | Not-a-Troll | Simplified view of a hypothetical application of TBC |
| 500a | user | Pearl representation of a human |
| 500b | user (JSON) | JSON representation of a human |
| 500c | phone | Pearl representation of a phone number |
| 500d | phone (JSON) | JSON representation of a phone number |
| 500e | name | Pearl representation of a name |
| 500f | areaCode | Pearl representation of an area code |
| 500g | localNumber | Pearl representation of a local phone number |
| 500h | cellPhone | Pearl representation of an cell phone number |
| 500i | homePhone | Pearl representation of an home phone number |
| 500j | intl_phone | Pearl representation of an international phone number |

| Reference Number | Reference Text | Comment |
|---|---|---|
| 500k | intl_phone (JSON) | JSON representation of an international phone number |
| 500m | countryCode | Pearl representation of a country code |
| 600 | Deployment Cell | TBC cell for deploying code |
| 650 | Eclipse | Third party integrated development environment. |
| 651 | GitHub | Third party code repository |
| 652 | GCP Cloud Build | Google Compute Platform build tool |
| 653 | Gradle | Third party code build tool |
| 654 | Docker | Third party containerized deployment tool |
| 655 | Kubernetes | Third party automated deployment tool |
| 656 | Linux | Third party operating system |
| 657 | Configuration translator | Translator of configuration |
| 658 | Terraform | Third party automated deployment tool |
| 659 | GitHub Translator | Makes GitHub available in the TBC framework |
| 670 | Deployment configuration cell | Translation cell which generates configuration for deployment |
| 680 | Product Deployment cell | Translation cell which deploys product catalog to the DB |
| 681 | CSV Text Pearl | Pearl representation of CSV file as list of strings |
| 682 | CSV-to-Pearl | Translation cell which converts CSV file to pearl |
| 683 | Product Catalog Pearl (CSV Ontology) | Pearl representation of CSV file in CSV ontology |
| 684 | Ontology Translator | Translates a pearl from one ontology to another |
| 685 | Product Catalog Pearl (System Ontology) | Pearl representation of CSV file in System ontology |
| 686 | Catalog Deploy | Translation cell which deploys product catalog to DB |
| 700 | Bootstrap | Bootstrapping code |
| 701 | EcoSystem | The outermost context of a TBC application |
| 702 | Primitive configuration files | Simple property file configuration |
| 703 | Accounts DB | Database in example running application which holds orders and returns |
| 704 | Products DB | Database in example running application which holds product info |
| 705 | Analytics DB | Database in example running application which holds analytics and logs |
| 706 | Local Filesystem | File system on disk |
| 707 | Google Cloud Files | Google cloud file system |
| 708 | DB Services | Code module that connects pearls to databases |
| 709 | File Services | Code module that connects pearls to files |
| 710 | Pub/Sub Services | Code module that connects pearls to pub/sub services |
| 711 | Persistence Services | Tran Code module that supports and encapsulates persistence |
| 712 | Ontologies | Code module that connects pearls to databases |
| 713 | Products table | Database table with product catalog |
| 901 | user | Human user |
| 902 | example running application front end | Front end of example running application |
| 903 | product db | Products database |
| 904 | computer | Generic computer |
| 905 | Developer | Human developer |
| 906 | Expert | Human expert used for creating training data for deep learning network. |
| 910 | Method Call | One java class calling another java class's method |
| 911 | REST Service | Invocation of REST service |
| 912 | gRPC Message | Invocation of gRPC (third party tool) messaging |
| 913 | Local Disk | Local disk on computer |

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 26 is a block diagram that illustrates a computer system 2600 upon which an embodiment may be implemented. Computer system 2600 includes a bus 2602 or other communication mechanism for communicating information, and a hardware processor 2604 coupled with bus 2602 for processing information. Hardware processor 2604 may be, for example, a general purpose microprocessor.

Computer system 2600 also includes a main memory 2606, such as a random access memory (RAM) or other dynamic storage device, coupled to bus 2602 for storing information and instructions to be executed by processor 2604. Main memory 2606 also may be used for storing temporary variables or other intermediate information during execution of instructions to be executed by processor 2604. Such instructions, when stored in non-transitory storage media accessible to processor 2604, render computer system 2600 into a special-purpose machine that is customized to perform the operations specified in the instructions.

Computer system 2600 further includes a read only memory (ROM) 2608 or other static storage device coupled to bus 2602 for storing static information and instructions for processor 2604. A storage device 2610, such as a magnetic disk, optical disk, or solid-state drive is provided and coupled to bus 2602 for storing information and instructions.

Computer system 2600 may be coupled via bus 2602 to a display 2612, such as a cathode ray tube (CRT), for displaying information to a computer user. An input device 2614, including alphanumeric and other keys, is coupled to bus 2602 for communicating information and command selections to processor 2604. Another type of user input device is cursor control 2616, such as a mouse, a trackball, or cursor direction keys for communicating direction information and command selections to processor 2604 and for controlling cursor movement on display 2612. This input device typically has two degrees of freedom in two axes, a first axis (e.g., x) and a second axis (e.g., y), that allows the device to specify positions in a plane.

Computer system 2600 may implement the techniques described herein using customized hard-wired logic, one or more ASICs or FPGAs, firmware and/or program logic which in combination with the computer system causes or programs computer system 2600 to be a special-purpose machine. According to one embodiment, the techniques herein are performed by computer system 2600 in response to processor 2604 executing one or more sequences of one or more instructions contained in main memory 2606. Such instructions may be read into main memory 2606 from another storage medium, such as storage device 2610. Execution of the sequences of instructions contained in main memory 2606 causes processor 2604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2610. Volatile media includes dynamic memory, such as main memory 2606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2602. Transmission media can also take the form of acoustic or light waves, such as those generated during radio-wave and infra-red data communications.

Various forms of media may be involved in carrying one or more sequences of one or more instructions to processor 2604 for execution. For example, the instructions may initially be carried on a magnetic disk or solid-state drive of a remote computer. The remote computer can load the instructions into its dynamic memory and send the instructions over a telephone line using a modem. A modem local to computer system 2600 can receive the data on the telephone line and use an infra-red transmitter to convert the data to an infra-red signal. An infra-red detector can receive the data carried in the infra-red signal and appropriate circuitry can place the data on bus 2602. Bus 2602 carries the data to main memory 2606, from which processor 2604 retrieves and executes the instructions. The instructions received by main memory 2606 may optionally be stored on storage device 2610 either before or after execution by processor 2604.

Computer system 2600 also includes a communication interface 2618 coupled to bus 2602. Communication interface 2618 provides a two-way data communication coupling to a network link 2620 that is connected to a local network 2622. For example, communication interface 2618 may be an integrated services digital network (ISDN) card, cable modem, satellite modem, or a modem to provide a data communication connection to a corresponding type of telephone line. As another example, communication interface 2618 may be a local area network (LAN) card to provide a data communication connection to a compatible LAN. Wireless links may also be implemented. In any such implementation, communication interface 2618 sends and receives electrical, electromagnetic or optical signals that carry digital data streams representing various types of information.

Network link 2620 typically provides data communication through one or more networks to other data devices. For example, network link 2620 may provide a connection through local network 2622 to a host computer 2624 or to data equipment operated by an Internet Service Provider (ISP) 2626. ISP 2626 in turn provides data communication services through the world wide packet data communication network now commonly referred to as the "Internet" 2628. Local network 2622 and Internet 2628 both use electrical, electromagnetic or optical signals that carry digital data streams. The signals through the various networks and the signals on network link 2620 and through communication interface 2618, which carry the digital data to and from computer system 2600, are example forms of transmission media.

Computer system 2600 can send messages and receive data, including program code, through the network(s), network link 2620 and communication interface 2618. In the Internet example, a server 2630 might transmit a requested code for an application program through Internet 2628, ISP 2626, local network 2622 and communication interface 2618.

The received code may be executed by processor 2604 as it is received, and/or stored in storage device 2610, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for improving builds of software applications comprising:
    storing an ontology comprising one or more translation cells comprising context data and software code, and a plurality of pearl schema nodes, each of which defining one or more attributes in the ontology;
    receiving input data at the one or more translation cells;
    using the context data of the one or more translation cells, translating the input data into canonical data;
    using the context data, translating the canonical data into output data;
    providing the output data to a client computing device;
    wherein the one or more translation cells comprises a particular pearl schema node comprising context data and session data;
    wherein the input data comprises a voice query;
    wherein translating the input data into canonical data comprises translating the voice query to a text query, removing the voice query from the particular pearl schema node, translating the text query into a canonical query, and storing both the text query and the canonical query in the particular pearl schema node;
    wherein translating the canonical data into output data comprises generating a response to the canonical query based, at least in part, on the session data, and removing the session data from the particular pearl schema node;
    wherein providing the output data to the client computing device comprises responding to the voice query with particular pearl schema node comprising the context data, text query, canonical query, and generated response.

2. The method of claim 1, wherein the plurality of pearl schema nodes comprise one or more of a pearl primitive node, pearl tree, or pearl rosette.

3. The method of claim 1, wherein a particular pearl node of the plurality of pearl schema nodes comprises an attribute value and acts as an interior node to another pearl node of the plurality of pearl schema nodes.

4. The method of claim 1, wherein an attribute of first pearl schema node of the plurality of pearl schema nodes comprises a second pearl node of the plurality of pearl schema nodes.

5. The method of claim 1, wherein a particular pearl schema node of the plurality of pearl schema nodes is mutable and wherein the method further comprises:
    receiving a request to seal the particular pearl schema node;
    augmenting the particular pearl schema node to be immutable.

6. The method of claim 1, further comprising:
    receiving a request to deploy code on a particular computing device;
    generating context data using the request to deploy code on the particular computing device and, in response, storing the context data in a translation cell.

7. The method of claim 1, wherein translating the canonical data into output data comprises instantiating one or more workers, the one or more workers comprising a worker interface comprising implementation details of the one or more workers and dependency injection data.

8. The method of claim 7, wherein the worker interface further comprises an A/B configuration which switches between directing traffic through each of two workers of the one or more workers.

9. A system comprising:
    one or more processors;
    a memory storing instructions which, when executed by the one or more processors, causes performance of:
    storing an ontology comprising one or more translation cells comprising context data and software code, and a plurality of pearl schema nodes, each of which defining one or more attributes in the ontology;
    receiving input data at the one or more translation cells;
    using the context data of the one or more translation cells, translating the input data into canonical data;
    using the context data, translating the canonical data into output data;
    providing the output data to a client computing device;
    wherein the one or more translation cells comprises a particular pearl schema node comprising context data and session data;
    wherein the input data comprises a voice query;
    wherein translating the input data into canonical data comprises translating the voice query to a text query, removing the voice query from the particular pearl schema node, translating the text query into a canonical query, and storing both the text query and the canonical query in the particular pearl schema node;
    wherein translating the canonical data into output data comprises generating a response to the canonical query based, at least in part, on the session data, and removing the session data from the particular pearl schema node;
    wherein providing the output data to the client computing device comprises responding to the voice query with particular pearl schema node comprising the context data, text query, canonical query, and generated response.

10. The system of claim 9, wherein the plurality of pearl schema nodes comprise one or more of a pearl primitive node, pearl tree, or pearl rosette.

11. The system of claim 9, wherein a particular pearl node of the plurality of pearl schema nodes comprises an attribute value and acts as an interior node to another pearl node of the plurality of pearl schema nodes.

12. The system of claim 9, wherein an attribute of first pearl schema node of the plurality of pearl schema nodes comprises a second pearl node of the plurality of pearl schema nodes.

13. The system of claim 9, wherein a particular pearl schema node of the plurality of pearl schema nodes is mutable and wherein the memory stores additional instructions which, when executed by the one or more processors, cause performance of:

receiving a request to seal the particular pearl schema node;

augmenting the particular pearl schema node to be immutable.

14. The system of claim 9, wherein the memory stores additional instructions which, when executed by the one or more processors, cause performance of:

receiving a request to deploy code on a particular computing device;

generating context data using the request to deploy code on the particular computing device and, in response, storing the context data in a translation cell.

15. The system of claim 9, wherein translating the canonical data into output data comprises instantiating one or more workers, the one or more workers comprising a worker interface comprising implementation details of the one or more workers and dependency injection data.

16. The system of claim 15, wherein the worker interface further comprises an A/B configuration which switches between directing traffic through each of two workers of the one or more workers.

* * * * *